US011887189B2

(12) United States Patent
Kerpel

(10) Patent No.: US 11,887,189 B2
(45) Date of Patent: Jan. 30, 2024

(54) APPARATUSES, METHODS AND SYSTEMS FOR A TRACKING PLATFORM FOR STANDARDIZED INSTRUMENTS

(71) Applicant: Chicago Mercantile Exchange Inc., Chicago, IL (US)

(72) Inventor: John Balaam Alexander Kerpel, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 127 days.

(21) Appl. No.: 17/200,274

(22) Filed: Mar. 12, 2021

(65) Prior Publication Data

US 2021/0201411 A1 Jul. 1, 2021

Related U.S. Application Data

(63) Continuation of application No. 16/050,066, filed on Jul. 31, 2018, now Pat. No. 10,984,471.

(51) Int. Cl.
*G06Q 40/04* (2012.01)
*G06Q 40/06* (2012.01)

(52) U.S. Cl.
CPC ............. *G06Q 40/04* (2013.01); *G06Q 40/06* (2013.01)

(58) Field of Classification Search
None
See application file for complete search history.

(56) References Cited

U.S. PATENT DOCUMENTS

| 4,903,201 | A | 2/1990 | Wagner |
| 6,263,321 | B1 | 7/2001 | Daughtery, III |
| 7,039,610 | B2 | 5/2006 | Morano et al. |
| 7,574,394 | B2 | 8/2009 | Chorna |
| 7,739,186 | B1* | 6/2010 | Gerber ............... G06Q 20/10 705/37 |
| 7,831,491 | B2 | 11/2010 | Newell et al. |
| 7,853,499 | B2 | 12/2010 | Czupek et al. |
| 8,447,694 | B2 | 5/2013 | Spurgin et al. |
| 8,560,421 | B1* | 10/2013 | Erlanger ............ G06Q 40/06 705/36 R |

(Continued)

OTHER PUBLICATIONS

"What are Single Stock Futures and Stock Index Futures" Quora—https://www.quora.com/What-are-single-stock-futures and stock-index-futures. Accessed Jun. 29, 2018.

*Primary Examiner* — William J Jacob
(74) *Attorney, Agent, or Firm* — Lempia Summerfield Katz LLC

(57) ABSTRACT

A computer implemented method for a tracking platform comprises receiving a plurality of data records for the financial instrument; determining a number of units of the futures contract associated with a starting capital amount based on the near settlement price of the data record with the earliest timestamp; processing the data records in sequence based on the timestamp by setting a value for a roll indicator; updating the number of units of the financial instrument if necessary; and determining a profit and loss ("PNL") for the data record based on the number of units of the financial instrument and a change in settlement price; calculating a tracking value for the financial instrument based on the PNLs of the processed data records; and generating at least one financial instrument having a value that is determined from the calculated tracking value.

22 Claims, 6 Drawing Sheets

(56) References Cited

U.S. PATENT DOCUMENTS

| | | |
|---|---|---|
| 9,710,854 B2 | 7/2017 | Kerpel et al. |
| 9,911,157 B2 | 3/2018 | Johnston et al. |
| 10,026,128 B2 | 7/2018 | Babel et al. |
| 10,984,471 B1 * | 4/2021 | Kerpel ............... G06Q 40/04 |
| 2004/0236661 A1 | 11/2004 | Benning |
| 2005/0096999 A1 | 5/2005 | Newell et al. |
| 2005/0203826 A1 | 9/2005 | Farrell et al. |
| 2006/0212384 A1 | 9/2006 | Spurgin |
| 2006/0253355 A1 * | 11/2006 | Shalen ............... G06Q 40/06 705/35 |
| 2007/0118453 A1 | 5/2007 | Bauerschmidt |
| 2007/0233594 A1 * | 10/2007 | Nafeh ............... G06Q 40/00 705/37 |
| 2008/0195519 A1 | 8/2008 | Stevens |
| 2010/0036757 A1 * | 2/2010 | Patterson ............... G06Q 40/06 705/37 |
| 2012/0136770 A1 * | 5/2012 | Co ............... G06Q 40/04 705/37 |
| 2012/0215672 A1 * | 8/2012 | Sutton ............... G06Q 40/04 705/37 |
| 2012/0221458 A1 * | 8/2012 | Booth ............... G06Q 40/04 705/37 |
| 2012/0290462 A1 | 11/2012 | Mehta |
| 2013/0024340 A1 | 1/2013 | Co |
| 2014/0006243 A1 | 1/2014 | Boudreault et al. |
| 2015/0073962 A1 | 3/2015 | Bixby et al. |
| 2015/0161727 A1 | 6/2015 | Callaway et al. |
| 2016/0247225 A1 | 8/2016 | Kerpel et al. |
| 2017/0018031 A1 * | 1/2017 | Bandy ............... G06F 16/951 |
| 2017/0331774 A1 | 11/2017 | Peck-Walden et al. |
| 2018/0285973 A1 | 10/2018 | Spurgin et al. |

* cited by examiner

APPARATUSES, METHODS AND SYSTEMS FOR A TRACKING PLATFORM FOR STANDARDIZED INSTRUMENTS

RELATED APPLICATIONS

This application claims priority to and the benefit as a continuation of U.S. patent application Ser. No. 16/050,066, filed Jul. 31, 2018, entitled, "APPARATUSES, METHODS AND SYSTEMS FOR A TRACKING PLATFORM FOR STANDARDIZED INSTRUMENTS", now U.S. Pat. No. 10,984,471, issued Apr. 20, 2021, the entirety of which is incorporated by reference herein and relied upon.

BACKGROUND

A futures contract provides a mechanism to buy or sell a particular commodity or asset (an underlying asset) at a predetermined price at a specified time in the future. Because futures contracts specify many of the contract conditions (e.g., particular terms such as units, or the underlying asset), they are standardized contracts. Some users buy (or sell) futures contracts because they wish to obtain (or deliver) the underlying asset at the price and time specified in the standardized futures contract. However, other users buy (or sell) futures contracts with the sole intention to sell (or buy) the futures contracts to earn profits based on a price movement of the futures contracts. Others buy or sell futures contracts to hedge or offset risks. Regardless, there is a large class of users that engage in futures trading who have no intention or desire to acquire or sell the underlying asset. For these users, many aspects of futures trading represent computational, logistical and/or administrative difficulties.

For example, futures contracts are typically divided into several (e.g., four) expiry dates throughout the year. When the date for a futures contract expires, that contract cannot be traded. Holding a contract past the expiration date triggers obligations for the futures contract holder to purchase (or sell) the underlying asset. Users who do not wish to buy or sell the underlying asset roll their contracts that are close to expiring (i.e., a near month) to a different month (e.g., a deferred month) to avoid the costs and obligations associated with settlement of the contracts. Rolling futures contracts can be a computational burden on computer systems of traders who simply want to participate in futures contract trading as asset managers, e.g., traders who do not want to actually take delivery of, or deliver, an underlying asset.

Moreover, futures contracts are standardized, so traders buy and sell futures contracts in the units in which the futures contract is offered, or made available for trading by a futures exchange. For example, an exchange computing system such as the CME may offer a futures contract for crude oil that specifies 1,000 barrels of crude oil. An exchange computing system that lists futures contracts does not typically allow traders to buy or sell fractions of futures contracts. A trader accordingly cannot use the crude oil futures contract to take a position in 1,200 barrels. A trader can only buy or sell whole (non-decimal/non-fractional) units of the futures contract. If a trader has an influx of additional cash to be invested, he/she may not be able to allocate all of that cash in the futures contract. The cash may remain unused (idle cash) in the trader's account.

As the value of the futures contract varies (with the changing price), a trader may then wish to use up the unused cash. The trader would accordingly need to change his or her positions to ensure that the cash can be fully utilized. A trader may need to modify his/her positions several times, leading to the trader's computer constantly or frequently computing when idle cash can be utilized/fully allocated and submitting potentially numerous electronic data transaction request messages to the exchange computing system to effect the desired changes in position.

Many other inefficiencies which will be described in further detail below make futures contract trading difficult, inconvenient, and computationally expensive for asset managers who have no desire to buy or sell the underlying asset of a futures contract. It is desirable to be able to buy and sell a financial instrument that replicates some of the qualities of futures contract trading without the computational, administrative and logistical difficulties of futures contract trading.

DETAILED DESCRIPTION

Figure 1:
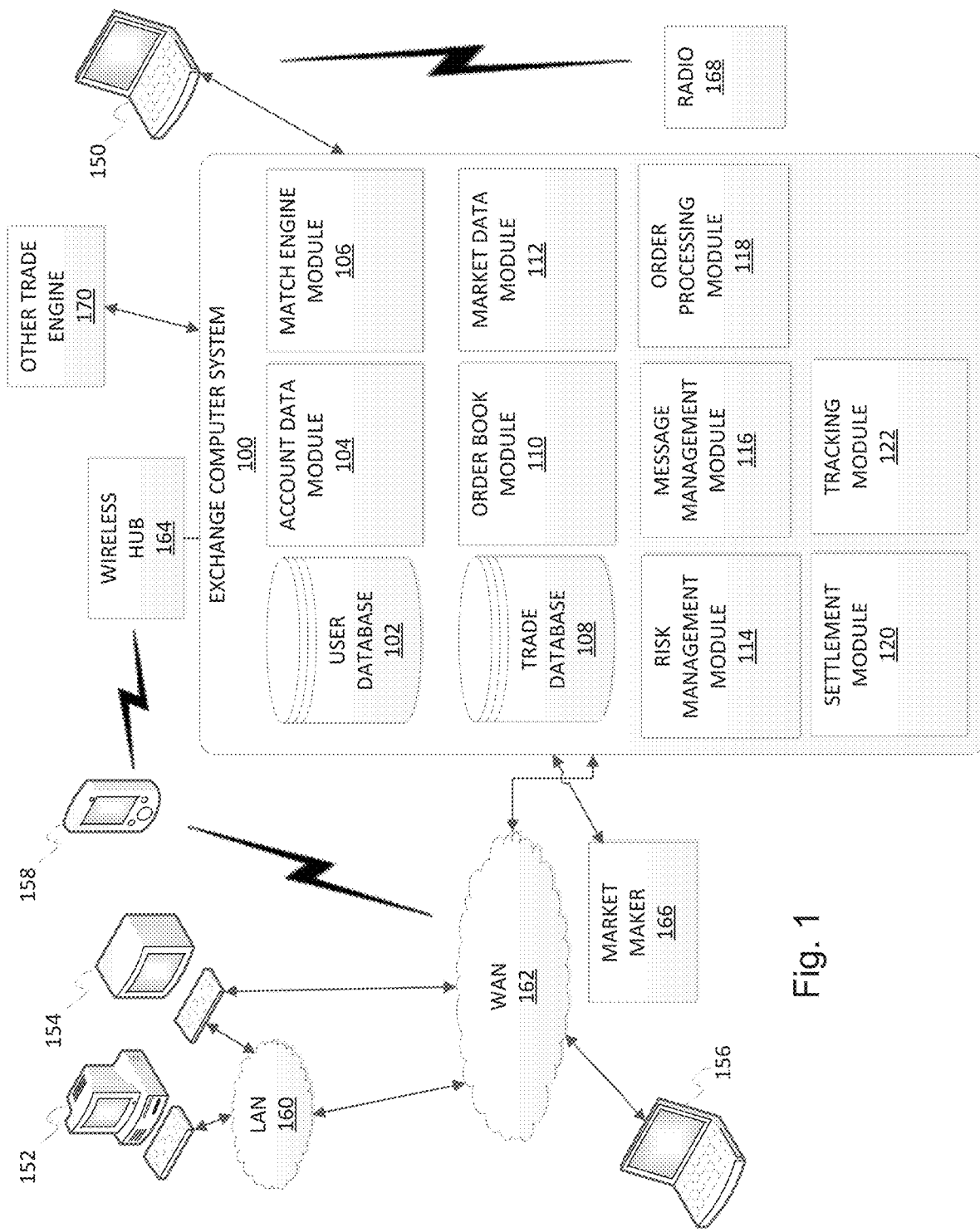
FIG. 1 depicts a computer network system, according to some embodiments.

The disclosure describes APPARATUSES, METHODS AND SYSTEMS FOR A TRACKING PLATFORM FOR STANDARDIZED INSTRUMENTS that facilitates calculation, determination, generation, management, analysis and/or communications relating to tracking financial instruments based on a tracking value, which may be referred to as a tracking index, that facilitates access to and utilization of market behavior of a target futures contract. One embodiment of the disclosure relates to a tracking module that generates a tracking instrument for a futures contract traded on an exchange computing system.

The disclosed embodiments may be implemented in association with a data transaction processing system that processes data items or objects, such as an exchange computing system. Customer or user devices (e.g., client computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity of a product at a specified price. Products, e.g., financial instruments, or order books representing the state of an electronic marketplace for a product, may be represented as data objects within the exchange computing system. The instructions may also be conditional, e.g., buy or sell a quantity of a product at a given value if a trade for the product is executed at some other reference value.

The data transaction processing system may include various specifically configured matching processors that match, e.g., automatically, electronic data transaction request messages for the same one of the data items or objects. The specifically configured matching processors may match, or attempt to match, electronic data transaction request messages based on multiple transaction matching parameters from the different client computers. Input electronic data transaction request messages may be received from different client computers over a data communication network, and output electronic data transaction result messages may be transmitted to the client computers and may be indicative of results of the attempts to match incoming electronic data transaction request messages. The specifically configured matching processors may additionally generate information indicative of a state of an environment (e.g., the state of the order book) based on the processing of the electronic data transaction request messages, and report this information to data recipient computing systems via outbound messages published via one or more data feeds that contain electronic data transaction result messages. While the disclosed embodiments may be described with respect to electronic data transaction request and result messages, it will be appreciated that the disclosed embodiments may be implemented with respect to other technologies later developed, such as photonic, e.g., light-based, messages.

For example, one exemplary environment where the disclosed embodiments may be desirable is in financial markets, and in particular, electronic financial exchanges, such as a futures exchange, such as the Chicago Mercantile Exchange Inc. (CME).

Exchange Computing System

An exchange provides one or more markets for the purchase and sale of various types of products including financial instruments such as stocks, bonds, futures contracts, options, currency, cash, and other similar instruments. Agricultural products and commodities are also examples of products traded on such exchanges. A futures contract is a product that is a contract for the future delivery of another financial instrument such as a quantity of grains, metals, oils, bonds, currency, or cash. Generally, each exchange establishes a specification for each market provided thereby that defines at least the product traded in the market, minimum quantities that must be traded, and minimum changes in price (e.g., tick size). For some types of products (e.g., futures or options), the specification further defines a quantity of the underlying product represented by one unit (or lot) of the product, and delivery and expiration dates. As will be described, the exchange may further define the matching algorithm, or rules, by which incoming orders will be matched/allocated to resting orders.

Generally, a market may involve market makers, such as market participants who consistently provide bids and/or offers at specific prices in a manner typically conducive to balancing risk, and market takers who may be willing to execute transactions at prevailing bids or offers may be characterized by more aggressive actions so as to maintain risk and/or exposure as a speculative investment strategy. From an alternate perspective, a market maker may be considered a market participant who places an order to sell at a price at which there is no previously or concurrently provided counter order. Similarly, a market taker may be considered a market participant who places an order to buy at a price at which there is a previously or concurrently provided counter order. A balanced and efficient market may involve both market makers and market takers, coexisting in a mutually beneficial basis. The mutual existence, when functioning properly, may facilitate liquidity in the market such that a market may exist with "tight" bid-ask spreads (e.g., small difference between bid and ask prices) and a "deep" volume from many currently provided orders such that large quantity orders may be executed without driving prices significantly higher or lower.

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price on or before a certain expiration date. An option contract offers an opportunity to take advantage of futures price moves without actually having a futures position. The commodity to be delivered in fulfillment of the contract, or alternatively the commodity for which the cash market price shall determine the final settlement price of the futures contract, is known as the contract's underlying reference or "underlier." The underlying or underlier for an options contract is the corresponding futures contract that is purchased or sold upon the exercise of the option.

The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

An exchange computing system may operate under a central counterparty model, where the exchange acts as an intermediary between market participants for the transaction of financial instruments. In particular, the exchange computing system novates itself into the transactions between the market participants, i.e., splits a given transaction between the parties into two separate transactions where the exchange computing system substitutes itself as the counterparty to each of the parties for that part of the transaction, sometimes referred to as a novation. In this way, the exchange computing system acts as a guarantor and central counterparty and there is no need for the market participants to disclose their identities to each other, or subject themselves to credit or other investigations by a potential counterparty. For example, the exchange computing system insulates one market participant from the default by another market participant. Market participants need only meet the requirements of the exchange computing system. Anonymity among the market participants encourages a more liquid market environment as there are lower barriers to participation. The exchange computing system can accordingly offer benefits such as centralized and anonymous matching and clearing.

A match engine within a financial instrument trading system may comprise a transaction processing system that processes a high volume, e.g., millions, of messages or orders in one day. The messages are typically submitted from market participant computers. Exchange match engine systems may be subject to variable messaging loads due to variable market messaging activity. Performance of a match engine depends to a certain extent on the magnitude of the messaging load and the work needed to process that message at any given time. An exchange match engine may process large numbers of messages during times of high volume messaging activity. With limited processing capacity, high messaging volumes may increase the response time or latency experienced by market participants.

Electronic messages such as incoming messages from market participants, i.e., "outright" messages, e.g., trade order messages, etc., are sent from client devices associated with market participants, or their representatives, to an electronic trading or market system.

The disclosed embodiments may be implemented by an exchange computing system to generate a new type of financial instrument that closely tracks a futures contract based on historical settlement prices of the futures contract, which may be traded on the exchange computing system.
Electronic Trading Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product.

Upon receipt of an incoming order to trade in a particular financial instrument, whether for a single-component financial instrument, e.g., a single futures contract, or for a multiple-component financial instrument, e.g., a combination contract such as a spread contract, a match engine, as described herein, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

In one embodiment, traders may buy and sell the disclosed tracking financial instrument instead of a futures contract that is associated with an underlying asset, where the futures contract may be settled by delivery of the underlying asset or by cash settlement.

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process. Other components of the electronic trading system, as will be described, then generate the respective order acknowledgment and market data messages and transmit those messages to the market participants.

Matching, which is a function typically performed by the exchange, is a process, for a given order which specifies a desire to buy or sell a quantity of a particular instrument at a particular price, of seeking/identifying one or more wholly or partially, with respect to quantity, satisfying counter orders thereto, e.g., a sell counter to an order to buy, or vice versa, for the same instrument at the same, or sometimes better, price (but not necessarily the same quantity), which are then paired for execution to complete a trade between the respective market participants (via the exchange) and at least partially satisfy the desired quantity of one or both of the order and/or the counter order, with any residual unsatisfied quantity left to await another suitable counter order, referred to as "resting." A match event may occur, for example, when an aggressing order matches with a resting order. In one embodiment, two orders match because one order includes instructions for or specifies buying a quantity of a particular instrument at a particular price, and the other order includes instructions for or specifies selling a (different or same) quantity of the instrument at a same or better price. It should be appreciated that performing an instruction associated with a message may include attempting to perform the instruction. Whether or not an exchange computing system is able to successfully perform an instruction may depend on the state of the electronic marketplace.

While the disclosed embodiments will be described with respect to a product by product or market by market implementation, e.g. implemented for each market/order book, it will be appreciated that the disclosed embodiments may be implemented so as to apply across markets for multiple products traded on one or more electronic trading systems, such as by monitoring an aggregate, correlated or other derivation of the relevant indicative parameters as described herein.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It may be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. In addition, it may be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participants are met, e.g., that transactional integrity and predictable system responses are maintained.

Financial instrument trading systems allow traders to submit orders and receive confirmations, market data, and other information electronically via electronic messages exchanged using a network. Electronic trading systems ideally attempt to offer a more efficient, fair and balanced market where market prices reflect a true consensus of the value of traded products among the market participants, where the intentional or unintentional influence of any one market participant is minimized if not eliminated, and where unfair or inequitable advantages with respect to information access are minimized if not eliminated.

Electronic marketplaces attempt to achieve these goals by using electronic messages to communicate actions and related data of the electronic marketplace between market participants, clearing firms, clearing houses, and other parties. The messages can be received using an electronic trading system, wherein an action or transaction associated with the messages may be executed. For example, the message may contain information relating to an order to buy or sell a product in a particular electronic marketplace, and the action associated with the message may indicate that the order is to be placed in the electronic marketplace such that other orders which were previously placed may potentially be matched to the order of the received message. Thus the electronic marketplace may conduct market activities through electronic systems.

As may be perceived/experienced by the market participants from outside the Exchange or electronic trading system operated thereby, the following sequence describes how, at least in part, information may be propagated in such a system and how orders may be processed: (1) An opportunity is created at a matching engine of the Exchange, such as by placing a recently received but unmatched order on the order book to rest; (2) The matching engine creates an update reflecting the opportunity and sends it to a feed engine; (3) The feed engine multicasts it to all of the market participants to advertise the opportunity to trade; (4) The market participants evaluate the opportunity and each, upon completion of their evaluation, may or may not choose to respond with an order responsive to the resting order, i.e. counter to the resting order; (5) The Exchange gateway receives any counter orders generated by the market participants, sends confirmation of receipt back directly to each submitting market participant, and forwards the received orders to the matching engine; and (6) The matching engine evaluates the received orders and matches the first arriving order against the resting opportunity and a trade is executed.

I. Electronic Data Transaction Request/Result Messages and Market Data Feeds

As used herein, a financial message, or an electronic message, refers both to messages communicated by market participants to an electronic trading or market system and vice versa. The messages may be communicated using packeting or other techniques operable to communicate information between systems and system components. Some messages may be associated with actions to be taken in the electronic trading or market system. In particular, in one embodiment, upon receipt of a request, a token is allocated and included in a TCP shallow acknowledgment transmission sent back to the participant acknowledging receipt of the request. It should be appreciated that while this shallow acknowledgment is, in some sense, a response to the request, it does not confirm the processing of an order included in the request. The participant, i.e., their device, then sends back a TCP acknowledgment which acknowledges receipt of the shallow acknowledgment and token.

Financial messages communicated to the electronic trading system, also referred to as "inbound" messages, may include associated actions that characterize the messages, such as trader orders, order modifications, order cancellations and the like, as well as other message types. Inbound messages may be sent from client devices associated with market participants, or their representatives, e.g., trade order messages, etc., to an electronic trading or market system. For example, a market participant may submit an electronic message to the electronic trading system that includes an associated specific action to be undertaken by the electronic trading system, such as entering a new trade order into the market or modifying an existing order in the market. In one embodiment, if a participant wishes to modify a previously sent request, e.g., a prior order which has not yet been processed or traded, they may send a request message comprising a request to modify the prior request. In one exemplary embodiment, the incoming request itself, e.g., the inbound order entry, may be referred to as an iLink message. iLink is a bidirectional communications/message protocol/message format implemented by the Chicago Mercantile Exchange Inc.

Financial messages communicated from the electronic trading system, referred to as "outbound" messages, may include messages responsive to inbound messages, such as confirmation messages, or other messages such as market update messages, quote messages, and the like. Outbound messages, or electronic data transaction result messages, may be disseminated via data feeds.

Financial messages may further be categorized as having or reflecting an impact on a market or electronic marketplace, also referred to as an "order book" or "book," for a traded product, such as a prevailing price therefore, number of resting orders at various price levels and quantities thereof, etc., or not having or reflecting an impact on a market or a subset or portion thereof. In one embodiment, an electronic order book may be understood to be an electronic collection of the outstanding or resting orders for a financial instrument.

For example, a request to place a trade may result in a response indicative of the trade either being matched with, or being rested on an order book to await, a suitable counter-order. This response may include a message directed solely to the trader who submitted the order to acknowledge receipt of the order and report whether it was matched, and the extent thereto, or rested. The response may further include a message to all market participants reporting a change in the order book due to the order, or an electronic data transaction result message. This response may take the form of a report of the specific change to the order book, e.g., an order for quantity X at price Y was added to the book (referred to, in one embodiment, as a Market By Order message), or may simply report the result, e.g., price level Y now has orders for a total quantity of Z (where Z is the sum of the previous resting quantity plus quantity X of the new order). In some cases, requests may elicit a non-impacting response, such as temporally proximate to the receipt of the request, and then cause a separate market-impact reflecting response at a later time. For example, a stop order, fill or kill order (FOK), also known as an immediate or cancel order, or other conditional request may not have an immediate market impacting effect, if at all, until the requisite conditions are met.

An acknowledgement or confirmation of receipt, e.g., a non-market impacting communication, may be sent to the trader simply confirming that the order was received. Upon the conditions being met and a market impacting result thereof occurring, a market-impacting message may be transmitted as described herein both directly back to the submitting market participant and to all market participants (in a Market By Price "MBP", or Market By Order "MBO"). It should be appreciated that additional conditions may be specified, such as a time or price limit, which may cause the order to be dropped or otherwise canceled and that such an event may result in another non-market-impacting communication instead. In some implementations, market impacting communications may be communicated separately from non-market impacting communications, such as via a separate communications channel or feed.

For additional details and descriptions of different market data feeds, see U.S. Patent Publication No. 2017/0331774, filed on May 16, 2016, entitled "Systems and Methods for Consolidating Multiple Feed Data", assigned to the assignee of the present application, the entirety of which is incorporated by reference herein and relied upon.

It should be further appreciated that various types of market data feeds may be provided which reflect different markets or aspects thereof. Market participants may then, for example, subscribe to receive those feeds of interest to them. For example, data recipient computing systems may choose to receive one or more different feeds. As market impacting communications usually tend to be more important to market participants than non-impacting communications, this separation may reduce congestion and/or noise among those communications having or reflecting an impact on a market or portion thereof. Furthermore, a particular market data feed may only communicate information related to the top buy/sell prices for a particular product, referred to as "top of book" feed, e.g., only changes to the top 10 price levels are communicated. Such limitations may be implemented to reduce consumption of bandwidth and message generation resources. In this case, while a request message may be considered market-impacting if it affects a price level other than the top buy/sell prices, it will not result in a message being sent to the market participants.

Examples of the various types of market data feeds which may be provided by electronic trading systems, such as the CME, in order to provide different types or subsets of market information or to provide such information in different formats include Market By Order, Market Depth (also known as Market by Price to a designated depth of the book), e.g., CME offers a 10-deep market by price feed, Top of Book (a single depth Market by Price feed), and combinations thereof. There may also be all manner of specialized feeds in terms of the content, i.e., providing, for example, derived data, such as a calculated index.

Market data feeds may be characterized as providing a "view" or "overview" of a given market, an aggregation or a portion thereof or changes thereto. For example, a market data feed, such as a Market By Price ("MBP") feed, may convey, with each message, the entire/current state of a market, or portion thereof, for a particular product as a result of one or more market impacting events. For example, an MBP message may convey a total quantity of resting buy/sell orders at a particular price level in response to a new order being placed at that price. An MBP message may convey a quantity of an instrument which was traded in response to an incoming order being matched with one or more resting orders. MBP messages may only be generated for events affecting a portion of a market, e.g., only the top 10 resting buy/sell orders and, thereby, only provide a view of that portion. As used herein, a market impacting request may be said to impact the "view" of the market as presented via the market data feed.

An MBP feed may utilize different message formats for conveying different types of market impacting events. For example, when a new order is rested on the order book, an MBP message may reflect the current state of the price level to which the order was added, e.g., the new aggregate quantity and the new aggregate number of resting orders. As can be seen, such a message conveys no information about the individual resting orders, including the newly rested order, themselves to the market participants. Only the submitting market participant, who receives a separate private message acknowledging the event, knows that it was their order that was added to the book. Similarly, when a trade occurs, an MBP message may be sent which conveys the price at which the instrument was traded, the quantity traded and the number of participating orders, but may convey no information as to whose particular orders contributed to the trade. MBP feeds may further batch reporting of multiple events, i.e., report the result of multiple market impacting events in a single message.

Alternatively, a market data feed, referred to as a Market By Order ("MBO") feed, may convey data reflecting a change that occurred to the order book rather than the result of that change, e.g., that order ABC for quantity X was added to price level Y or that order ABC and order XYZ traded a quantity X at a price Y. In this case, the MBO message identifies only the change that occurred so a market participant wishing to know the current state of the order book must maintain their own copy and apply the change reflected in the message to know the current state. As can be seen, MBO messages may carry much more data than MBP messages because MBO messages reflect information about each order, whereas MBP messages contain information about orders affecting some predetermined value levels. Furthermore, because specific orders, but not the submitting traders thereof, are identified, other market participants may be able to follow that order as it progresses through the market, e.g., as it is modified, canceled, traded, etc.

An MBP book data object may include information about multiple values. The MBP book data object may be arranged and structured so that information about each value is aggregated together. Thus, for a given value V (e.g., a price), the MBP book data object may aggregate all the information by value, such as for example, the number of orders having a certain position at value V, the quantity of total orders resting at value V, etc. Thus, the value field may be the key, or may be a unique field, within an MBP book data object. In one embodiment, the value for each entry within the MBP book data object is different. In one embodiment, information in an MBP book data object is presented in a manner such that the value field is the most granular field of information.

An MBO book data object may include information about multiple orders. The MBO book data object may be arranged and structured so that information about each order is represented. Thus, for a given order O, the MBO book data object may provide all of the information for order O. Thus, the order field may be the key, or may be a unique field, within an MBO book data object. In one embodiment, the order ID for each entry within the MBO book data object is different. In one embodiment, information in an MBO book data object is presented in a manner such that the order field is the most granular field of information.

Thus, the MBO book data object may include data about unique orders, e.g., all unique resting orders for a product, and the MBP book data object may include data about unique values, e.g., up to a predetermined level, e.g., top ten price or value levels, for a product.

It should be appreciated that the number, type and manner of market data feeds provided by an electronic trading system are implementation dependent and may vary depending upon the types of products traded by the electronic trading system, customer/trader preferences, bandwidth and data processing limitations, etc. and that all such feeds, now available or later developed, are contemplated herein. MBP and MBO feeds may refer to categories/variations of market data feeds, distinguished by whether they provide an indication of the current state of a market resulting from a market impacting event (MBP) or an indication of the change in the current state of a market due to a market impacting event (MBO).

Messages, whether MBO or MBP, generated responsive to market impacting events which are caused by a single order, such as a new order, an order cancellation, an order modification, etc., are fairly simple and compact and easily created and transmitted. However, messages, whether MBO or MBP, generated responsive to market impacting events which are caused by more than one order, such as a trade, may require the transmission of a significant amount of data to convey the requisite information to the market participants. For trades involving a large number of orders, e.g., a buy order for a quantity of 5000 which matches 5000 sell orders each for a quantity of 1, a significant amount of information may need to be sent, e.g., data indicative of each of the 5000 trades that have participated in the market impacting event.

In one embodiment, an exchange computing system may generate multiple order book objects, one for each type of view that is published or provided. For example, the system may generate an MBO book object and an MBP book object. It should be appreciated that each book object, or view for a product or market, may be derived from the MBO book object, which includes all the orders for a given financial product or market.

An inbound message may include an order that affects the MBO book object, the MBP book object, or both. An outbound message may include data from one or more of the structures within the exchange computing system, e.g., the MBO book object queues or the MBP book object queues.

Furthermore, each participating trader needs to receive a notification that their particular order has traded. Continuing with the example, this may require sending 5001 individual trade notification messages, or even 10,000+ messages where each contributing side (buy vs. sell) is separately reported, in addition to the notification sent to all of the market participants.

As detailed in U.S. Patent Publication No. 2015/0161727, the entirety of which is incorporated by reference herein and relied upon, it may be recognized that trade notifications sent to all market participants may include redundant information repeated for each participating trade and a structure of an MBP trade notification message may be provided which results in a more efficient communication of the occurrence of a trade. The message structure may include a header portion which indicates the type of transaction which occurred, i.e., a trade, as well as other general information about the event, an instrument portion which comprises data about each instrument which was traded as part of the transaction, and an order portion which comprises data about each participating order. In one embodiment, the header portion may include a message type, Transaction Time, Match Event Indicator, and Number of Market Data Entries ("No. MD Entries") fields. The instrument portion may include a market data update action indicator ("MD Update Action"), an indication of the Market Data Entry Type ("MD Entry Type"), an identifier of the instrument/security involved in the transaction ("Security ID"), a report sequence indicator ("Rpt Seq"), the price at which the instrument was traded ("MD Entry PX"), the aggregate quantity traded at the indicated price ("ConsTradeQty"), the number of participating orders ("NumberOfOrders"), and an identifier of the aggressor side ("Aggressor Side") fields. The order portion may further include an identifier of the participating order ("Order ID"), described in more detail below, and the quantity of the order traded ("MD Entry Size") fields. It should be appreciated that the particular fields included in each portion are implementation dependent and that different fields in addition to, or in lieu of, those listed may be included depending upon the implementation. It should be appreciated that the exemplary fields can be compliant with the FIX binary and/or FIX/FAST protocol for the communication of the financial information.

The instrument portion contains a set of fields, e.g., seven fields accounting for 23 bytes, which are repeated for each participating instrument. In complex trades, such as trades involving combination orders or strategies, e.g., spreads, or implied trades, there may be multiple instruments being exchanged among the parties. In one embodiment, the order portion includes only one field, accounting for 4 bytes, for each participating order which indicates the quantity of that order which was traded. As will be discussed below, the order portion may further include an identifier of each order, accounting for an additional 8 bytes, in addition to the quantity thereof traded. As should be appreciated, data which would have been repeated for each participating order, is consolidated or otherwise summarized in the header and instrument portions of the message thereby eliminating redundant information and, overall, significantly reducing the size of the message.

The disclosed embodiments may be applicable to the use of either an MBP market data feed and/or an MBO market data feed.

Matching and Transaction Processing

Market participants, e.g., traders, use software to send orders or messages to the trading platform. The order identifies the product, the quantity of the product the trader wishes to trade, a price at which the trader wishes to trade the product, and a direction of the order (i.e., whether the order is a bid, i.e., an offer to buy, or an ask, i.e., an offer to sell). It will be appreciated that there may be other order types or messages that traders can send including requests to modify or cancel a previously submitted order.

The exchange computer system monitors incoming orders received thereby and attempts to identify, i.e., match or allocate, as described herein, one or more previously received, but not yet matched, orders, i.e., limit orders to buy or sell a given quantity at a given price, referred to as "resting" orders, stored in an order book database, wherein each identified order is contra to the incoming order and has a favorable price relative to the incoming order. An incoming order may be an "aggressor" order, i.e., a market order to sell a given quantity at whatever may be the current resting bid order price(s) or a market order to buy a given quantity at whatever may be the current resting ask order price(s). An incoming order may be a "market making" order, i.e., a market order to buy or sell at a price for which there are currently no resting orders. In particular, if the incoming order is a bid, i.e., an offer to buy, then the identified order(s) will be an ask, i.e., an offer to sell, at a price that is identical to or higher than the bid price. Similarly, if the incoming order is an ask, i.e., an offer to sell, the identified order(s) will be a bid, i.e., an offer to buy, at a price that is identical to or lower than the offer price.

An exchange computing system may receive conditional orders or messages for a data object, where the order may include two prices or values: a reference value and a stop value. A conditional order may be configured so that when a product represented by the data object trades at the reference price, the stop order is activated at the stop value. For example, if the exchange computing system's order management module (described below) includes a stop order with a stop price of 5 and a limit price of 1 for a product, and a trade at 5 (i.e., the stop price of the stop order) occurs, then the exchange computing system attempts to trade at 1 (i.e., the limit price of the stop order). In other words, a stop order is a conditional order to trade (or execute) at the limit price that is triggered (or elected) when a trade at the stop price occurs.

Stop orders also rest on, or are maintained in, an order book to monitor for a trade at the stop price, which triggers an attempted trade at the limit price. In some embodiments, a triggered limit price for a stop order may be treated as an incoming order.

Upon identification (matching) of a contra order(s), a minimum of the quantities associated with the identified order and the incoming order is matched and that quantity of each of the identified and incoming orders become two halves of a matched trade that is sent to a clearing house. The exchange computer system considers each identified order in this manner until either all of the identified orders have been considered or all of the quantity associated with the incoming order has been matched, i.e., the order has been filled. If any quantity of the incoming order remains, an entry may be created in the order book database and information regarding the incoming order is recorded therein, i.e., a resting order is placed on the order book for the remaining quantity to await a subsequent incoming order counter thereto.

It should be appreciated that in electronic trading systems implemented via an exchange computing system, a trade price (or match value) may differ from (i.e., be better for the submitter, e.g., lower than a submitted buy price or higher than a submitted sell price) the limit price that is submitted, e.g., a price included in an incoming message, or a triggered limit price from a stop order.

As used herein, "better" than a reference value means lower than the reference value if the transaction is a purchase (or acquire) transaction, and higher than the reference value if the transaction is a sell transaction. Said another way, for purchase (or acquire) transactions, lower values are better, and for sell (or relinquish) transactions, higher values are better.

Traders access the markets on a trading platform using trading software that receives and displays at least a portion of the order book for a market, i.e., at least a portion of the currently resting orders, enables a trader to provide parameters for an order for the product traded in the market, and transmits the order to the exchange computer system. The trading software typically includes a graphical user interface to display at least a price and quantity of some of the entries in the order book associated with the market. The number of entries of the order book displayed is generally preconfigured by the trading software, limited by the exchange computer system, or customized by the user. Some graphical user interfaces display order books of multiple markets of one or more trading platforms. The trader may be an individual who trades on his/her behalf, a broker trading on behalf of another person or entity, a group, or an entity. Furthermore, the trader may be a system that automatically generates and submits orders.

If the exchange computer system identifies that an incoming market order may be filled by a combination of multiple resting orders, e.g., the resting order at the best price only partially fills the incoming order, the exchange computer system may allocate the remaining quantity of the incoming, i.e., that which was not filled by the resting order at the best price, among such identified orders in accordance with prioritization and allocation rules/algorithms, referred to as "allocation algorithms" or "matching algorithms," as, for example, may be defined in the specification of the particular financial product or defined by the exchange for multiple financial products. Similarly, if the exchange computer system identifies multiple orders contra to the incoming limit order and that have an identical price which is favorable to the price of the incoming order, i.e., the price is equal to or better, e.g., lower if the incoming order is a buy (or instruction to purchase, or instruction to acquire) or higher if the incoming order is a sell (or instruction to relinquish), than the price of the incoming order, the exchange computer system may allocate the quantity of the incoming order among such identified orders in accordance with the matching algorithms as, for example, may be defined in the specification of the particular financial product or defined by the exchange for multiple financial products.

An exchange responds to inputs, such as trader orders, cancellation, etc., in a manner as expected by the market participants, such as based on market data, e.g., prices, available counter-orders, etc., to provide an expected level of certainty that transactions will occur in a consistent and predictable manner and without unknown or unascertainable risks. Accordingly, the method by which incoming orders are matched with resting orders must be defined so that market participants have an expectation of what the result will be when they place an order or have resting orders and an incoming order is received, even if the expected result is, in fact, at least partially unpredictable due to some component of the process being random or arbitrary or due to market participants having imperfect or less than all information, e.g., unknown position of an order in an order book. Typically, the exchange defines the matching/allocation algorithm that will be used for a particular financial product, with or without input from the market participants. Once defined for a particular product, the matching/allocation algorithm is typically not altered, except in limited circumstance, such as to correct errors or improve operation, so as not to disrupt trader expectations. It will be appreciated that different products offered by a particular exchange may use different matching algorithms.

For example, a first-in/first-out (FIFO) matching algorithm, also referred to as a "Price Time" algorithm, considers each identified order sequentially in accordance with when the identified order was received. The quantity of the incoming order is matched to the quantity of the identified order at the best price received earliest, then quantities of the next earliest best price orders, and so on until the quantity of the incoming order is exhausted. Some product specifications define the use of a pro-rata matching algorithm, wherein a quantity of an incoming order is allocated to each of plurality of identified orders proportionally. Some exchange computer systems provide a priority to certain standing orders in particular markets. An example of such an order is the first order that improves a price (i.e., improves the market) for the product during a trading session. To be given priority, the trading platform may require that the quantity associated with the order is at least a minimum quantity. Further, some exchange computer systems cap the quantity of an incoming order that is allocated to a standing order on the basis of a priority for certain markets. In addition, some exchange computer systems may give a preference to orders submitted by a trader who is designated as a market maker for the product. Other exchange computer systems may use other criteria to determine whether orders submitted by a particular trader are given a preference. Typically, when the exchange computer system allocates a quantity of an incoming order to a plurality of identified orders at the same price, the trading host allocates a quantity of the incoming order to any orders that have been given priority. The exchange computer system thereafter allocates any remaining quantity of the incoming order to orders submitted by traders designated to have a preference, and then allocates any still remaining quantity of the incoming order using the FIFO or pro-rata algorithms. Pro-rata algorithms used in some markets may require that an allocation provided to a particular order in accordance with the pro-rata algorithm must meet at least a minimum allocation quantity. Any orders that do not meet or exceed the minimum allocation quantity are allocated to on a FIFO basis after the pro-rata allocation (if any quantity of the incoming order remains). More information regarding order allocation may be found in U.S. Pat. No. 7,853,499, the entirety of which is incorporated by reference herein and relied upon.

Other examples of matching algorithms which may be defined for allocation of orders of a particular financial product include: Price Explicit Time; Order Level Pro Rata; Order Level Priority Pro Rata; Preference Price Explicit Time; Preference Order Level Pro Rata; Preference Order Level Priority Pro Rata; Threshold Pro-Rata; Priority Threshold Pro-Rata; Preference Threshold Pro-Rata; Priority Preference Threshold Pro-Rata; and Split Price-Time Pro-Rata, which are described in U.S. patent application Ser. No. 13/534,499, filed on Jun. 27, 2012, entitled "Multiple Trade Matching Algorithms," published as U.S. Patent Application Publication No. 2014/0006243 A1, the entirety of which is incorporated by reference herein and relied upon.

With respect to incoming orders, some traders, such as automated and/or algorithmic traders, attempt to respond to market events, such as to capitalize upon a mispriced resting order or other market inefficiency, as quickly as possible. This may result in penalizing the trader who makes an errant trade, or whose underlying trading motivations have changed, and who cannot otherwise modify or cancel their order faster than other traders can submit trades there against. It may considered that an electronic trading system that rewards the trader who submits their order first creates an incentive to either invest substantial capital in faster trading systems, participate in the market substantially to capitalize on opportunities (aggressor side/lower risk trading) as opposed to creating new opportunities (market making/higher risk trading), modify existing systems to streamline business logic at the cost of trade quality, or reduce one's activities and exposure in the market. The result may be a lesser quality market and/or reduced transaction volume, and corresponding thereto, reduced fees to the exchange.

With respect to resting orders, allocation/matching suitable resting orders to match against an incoming order can be performed, as described herein, in many different ways. Generally, it will be appreciated that allocation/matching algorithms are only needed when the incoming order quantity is less than the total quantity of the suitable resting orders as, only in this situation, is it necessary to decide which resting order(s) will not be fully satisfied, which trader(s) will not get their orders filled. It can be seen from the above descriptions of the matching/allocation algorithms, that they fall generally into three categories: time priority/first-in-first-out ("FIFO"), pro rata, or a hybrid of FIFO and pro rata.

FIFO generally rewards the first trader to place an order at a particular price and maintains this reward indefinitely. So if a trader is the first to place an order at price X, no matter how long that order rests and no matter how many orders may follow at the same price, as soon as a suitable incoming order is received, that first trader will be matched first. This "first mover" system may commit other traders to positions in the queue after the first move traders. Furthermore, while it may be beneficial to give priority to a trader who is first to place an order at a given price because that trader is, in effect, taking a risk, the longer that the trader's order rests, the less beneficial it may be. For instance, it could deter other traders from adding liquidity to the marketplace at that price because they know the first mover (and potentially others) already occupies the front of the queue.

With a pro rata allocation, incoming orders are effectively split among suitable resting orders. This provides a sense of fairness in that everyone may get some of their order filled. However, a trader who took a risk by being first to place an order (a "market turning" order) at a price may end up having to share an incoming order with a much later submitted order. Furthermore, as a pro rata allocation distributes the incoming order according to a proportion based on the resting order quantities, traders may place orders for large quantities, which they are willing to trade but may not necessarily want to trade, in order to increase the proportion of an incoming order that they will receive. This results in an escalation of quantities on the order book and exposes a trader to a risk that someone may trade against one of these orders and subject the trader to a larger trade than they intended. In the typical case, once an incoming order is allocated against these large resting orders, the traders subsequently cancel the remaining resting quantity which may frustrate other traders. Accordingly, as FIFO and pro rata both have benefits and problems, exchanges may try to use hybrid allocation/matching algorithms which attempt to balance these benefits and problems by combining FIFO and pro rata in some manner. However, hybrid systems define conditions or fixed rules to determine when FIFO should be used and when pro rata should be used. For example, a fixed percentage of an incoming order may be allocated using a FIFO mechanism with the remainder being allocated pro rata.

Clearing House

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system may differ from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system may not allow losses to accumulate over time or allow a market participant the opportunity to defer losses associated with market positions.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of enforcing a performance bond or margin requirement. For example, a market participant may use the disclosed embodiments in a simulation or other analysis of a portfolio. In such cases, the settlement price may be useful as an indication of a value at risk and/or cash flow obligation rather than a performance bond. The disclosed embodiments may also be used by market participants or other entities to forecast or predict the effects of a prospective position on the margin requirement of the market participant.

As discussed herein, the disclosed embodiments may use the settlement prices, along with other market data for a target futures contract, to determine a tracking value. The value of a tracking financial instrument may be based on the tracking value, whereby trading the tracking financial instrument enables a trader to avoid many of the complications (e.g., computational, logistical, etc.) associated with trading a traditional futures contract.

Spread Instruments

Traders trading on an exchange including, for example, exchange computer system 100, often desire to trade multiple financial instruments in combination. Each component of the combination may be called a leg. Traders can submit orders for individual legs or in some cases can submit a single order for multiple financial instruments in an exchange-defined combination. Such orders may be called a strategy order, a spread order, or a variety of other names.

A spread instrument may involve the simultaneous purchase of one security and sale of a related security, called legs, as a unit. The legs of a spread instrument may be options or futures contracts, or combinations of the two. Trades in spread instruments are executed to yield an overall net position whose value, called the spread, depends on the difference between the prices of the legs. Spread instruments may be traded in an attempt to profit from the widening or narrowing of the spread, rather than from movement in the prices of the legs directly. Spread instruments are either "bought" or "sold" depending on whether the trade will profit from the widening or narrowing of the spread, respectively. An exchange often supports trading of common spreads as a unit rather than as individual legs, thus ensuring simultaneous execution of the two legs, eliminating the execution risk of one leg executing but the other failing.

One example of a spread instrument is a calendar spread instrument. The legs of a calendar spread instrument differ in delivery date of the underlier. The leg with the earlier occurring delivery date is often referred to as the lead month contract. A leg with a later occurring delivery date is often referred to as a deferred month contract. Another example of a spread instrument is a butterfly spread instrument, which includes three legs having different delivery dates. The delivery dates of the legs may be equidistant to each other. The counterparty orders that are matched against such a combination order may be individual, "outright" orders or may be part of other combination orders.

In other words, an exchange may receive, and hold or let rest on the books, outright orders for individual contracts as well as outright orders for spreads associated with the individual contracts. An outright order (for either a contract or for a spread) may include an outright bid or an outright offer, although some outright orders may bundle many bids or offers into one message (often called a mass quote).

A spread is an order for the price difference between two contracts. This results in the trader holding a long and a short position in two or more related futures or options on futures contracts, with the objective of profiting from a change in the price relationship. A typical spread product includes multiple legs, each of which may include one or more underlying financial instruments. A butterfly spread product, for example, may include three legs. The first leg may consist of buying a first contract. The second leg may consist of selling two of a second contract. The third leg may consist of buying a third contract. The price of a butterfly spread product may be calculated as:

Butterfly=$Leg1-2*Leg2+Leg3$

In the above equation, Leg1 equals the price of the first contract, Leg2 equals the price of the second contract and Leg3 equals the price of the third contract. Thus, a butterfly spread could be assembled from two inter-delivery spreads in opposite directions with the center delivery month common to both spreads.

A calendar spread, also called an intra-commodity spread, for futures is an order for the simultaneous purchase and sale of the same futures contract in different contract months (i.e., buying a September CME S&P 500® futures contract and selling a December CME S&P 500 futures contract).

A crush spread is an order, usually in the soybean futures market, for the simultaneous purchase of soybean futures and the sale of soybean meal and soybean oil futures to establish a processing margin. A crack spread is an order for a specific spread trade involving simultaneously buying and selling contracts in crude oil and one or more derivative products, typically gasoline and heating oil. Oil refineries may trade a crack spread to hedge the price risk of their operations, while speculators attempt to profit from a change in the oil/gasoline price differential.

A straddle is an order for the purchase or sale of an equal number of puts and calls, with the same strike price and expiration dates. A long straddle is a straddle in which a long position is taken in both a put and a call option. A short straddle is a straddle in which a short position is taken in both a put and a call option. A strangle is an order for the purchase of a put and a call, in which the options have the same expiration and the put strike is lower than the call strike, called a long strangle. A strangle may also be the sale of a put and a call, in which the options have the same expiration and the put strike is lower than the call strike, called a short strangle. A pack is an order for the simultaneous purchase or sale of an equally weighted, consecutive series of four futures contracts, quoted on an average net change basis from the previous day's settlement price. Packs provide a readily available, widely accepted method for executing multiple futures contracts with a single transaction. A bundle is an order for the simultaneous sale or purchase of one each of a series of consecutive futures contracts. Bundles provide a readily available, widely accepted method for executing multiple futures contracts with a single transaction.

Implication

Thus an exchange may match outright orders, such as individual contracts or spread orders (which as discussed herein could include multiple individual contracts). The exchange may also imply orders from outright orders. For example, exchange computer system 100 may derive, identify and/or advertise, publish, display or otherwise make available for trading orders based on outright orders.

As was described above, the financial instruments which are the subject of the orders to trade, may include one or more component financial instruments. While each financial instrument may have its own order book, i.e. market, in which it may be traded, in the case of a financial instrument having more than one component financial instrument, those component financial instruments may further have their own order books in which they may be traded. Accordingly, when an order for a financial instrument is received, it may be matched against a suitable counter order in its own order book or, possibly, against a combination of suitable counter orders in the order books the component financial instruments thereof, or which share a common component financial instrument. For example, an order for a spread contract comprising component financial instruments A and B may be matched against another suitable order for that spread contract. However, it may also be matched against suitable separate counter orders for the A and for the B component financial instruments found in the order books therefore. Similarly, if an order for the A contract is received and suitable match cannot be found in the A order book, it may be possible to match order for A against a combination of a suitable counter order for a spread contract comprising the A and B component financial instruments and a suitable counter order for the B component financial instrument. This is referred to as "implication" where a given order for a financial instrument may be matched via a combination of suitable counter orders for financial instruments which share common, or otherwise interdependent, component financial instruments. Implication increases the liquidity of the market by providing additional opportunities for orders to be traded. Increasing the number of transactions may further increase the number of transaction fees collected by the electronic trading system.

The order for a particular financial instrument actually received from a market participant, whether it comprises one or more component financial instruments, is referred to as a "real" or "outright" order, or simply as an outright. The one or more orders which must be synthesized and submitted into order books other than the order book for the outright order to create matches therein, are referred to as "implied" orders.

Upon receipt of an incoming order, the identification or derivation of suitable implied orders which would allow at least a partial trade of the incoming outright order to be executed is referred to as "implication" or "implied matching", the identified orders being referred to as an "implied match." Depending on the number of component financial instruments involved, and whether those component financial instruments further comprise component financial instruments of their own, there may be numerous different implied matches identified which would allow the incoming order to be at least partially matched and mechanisms may be provided to arbitrate, e.g., automatically, among them, such as by picking the implied match comprising the least number of component financial instruments or the least number of synthesized orders.

Upon receipt of an incoming order, or thereafter, a combination of one or more suitable/hypothetical counter orders which have not actually been received but if they were received, would allow at least a partial trade of the incoming order to be executed, may be, e.g., automatically, identified or derived and referred to as an "implied opportunity." As with implied matches, there may be numerous implied opportunities identified for a given incoming order. Implied opportunities are advertised to the market participants, such as via suitable synthetic orders, e.g. counter to the desired order, being placed on the respective order books to rest (or give the appearance that there is an order resting) and presented via the market data feed, electronically communicated to the market participants, to appear available to trade in order to solicit the desired orders from the market participants. Depending on the number of component financial instruments involved, and whether those component financial instruments further comprise component financial instruments of their own, there may be numerous implied opportunities, the submission of a counter order in response thereto, that would allow the incoming order to be at least partially matched.

Implied opportunities, e.g. the advertised synthetic orders, may frequently have better prices than the corresponding real orders in the same contract. This can occur when two or more traders incrementally improve their order prices in the hope of attracting a trade, since combining the small improvements from two or more real orders can result in a big improvement in their combination. In general, advertising implied opportunities at better prices will encourage traders to enter the opposing orders to trade with them. The more implied opportunities that the match engine of an electronic trading system can calculate/derive, the greater this encouragement will be and the more the exchange will benefit from increased transaction volume. However, identifying implied opportunities may be computationally intensive. One response message may trigger the calculations of hundreds or thousands of calculations to determine implied opportunities, which are then published, e.g., as implied messages, via market data feeds. In a high performance trading system where low transaction latency is important, it may be important to identify and advertise implied opportunities quickly so as to improve or maintain market participant interest and/or market liquidity.

For example, two different outright orders may be resting on the books, or be available to trade or match. The orders may be resting because there are no outright orders that match the resting orders. Thus, each of the orders may wait or rest on the books until an appropriate outright counteroffer comes into the exchange, or is placed by a user of the exchange. The orders may be for two different contracts that only differ in delivery dates. It should be appreciated that such orders could be represented as a calendar spread order. Instead of waiting for two appropriate outright orders to be received that would match the two existing or resting orders, the exchange computer system may identify a hypothetical spread order that, if entered into the system as a tradable spread order, would allow the exchange computer system to match the two outright orders. The exchange may thus advertise or make available a spread order to users of the exchange system that, if matched with a tradable spread order, would allow the exchange to also match the two resting orders. Thus, the exchange computing system may be configured to detect that the two resting orders may be combined into an order in the spread instrument and accordingly creates an implied order.

In other words, the exchange may imply the counteroffer order by using multiple orders to create the counteroffer order. Examples of spreads include implied IN, implied OUT, 2nd- or multiple-generation, crack spreads, straddle, strangle, butterfly, and pack spreads. Implied IN spread orders are derived from existing outright orders in individual legs. Implied OUT outright orders are derived from a combination of an existing spread order and an existing outright order in one of the individual underlying legs. Implied orders can fill in gaps in the market and allow spreads and outright futures traders to trade in a product where there would otherwise have been little or no available bids and asks.

For example, implied IN spreads may be created from existing outright orders in individual contracts where an outright order in a spread can be matched with other outright orders in the spread or with a combination of orders in the legs of the spread. An implied OUT spread may be created from the combination of an existing outright order in a spread and an existing outright order in one of the individual underlying leg. An implied IN or implied OUT spread may be created when an electronic matching system simultaneously works synthetic spread orders in spread markets and synthetic orders in the individual leg markets without the risk to the trader/broker of being double filled or filled on one leg and not on the other leg.

By linking the spread and outright markets, implied spread trading increases market liquidity. For example, a buy in one contract month and an offer in another contract month in the same futures contract can create an implied market in the corresponding calendar spread. An exchange may match an order for a spread product with another order for the spread product. Some exchanges attempt to match orders for spread products with multiple orders for legs of the spread products. With such systems, every spread product contract is broken down into a collection of legs and an attempt is made to match orders for the legs.

Implied orders, unlike real orders, are generated by electronic trading systems. In other words, implied orders are computer generated orders derived from real orders. The system creates the "derived" or "implied" order and provides the implied order as a market that may be traded against. If a trader trades against this implied order, then the real orders that combined to create the implied order and the resulting market are executed as matched trades. Implied orders generally increase overall market liquidity. The creation of implied orders increases the number of tradable items, which has the potential of attracting additional traders. Exchanges benefit from increased transaction volume. Transaction volume may also increase as the number of matched trade items increases.

Examples of implied spread trading include those disclosed in U.S. Patent Publication No. 2005/0203826, entitled "Implied Spread Trading System," the entire disclosure of which is incorporated by reference herein and relied upon. Examples of implied markets include those disclosed in U.S. Pat. No. 7,039,610, entitled "Implied Market Trading System," the entire disclosure of which is incorporated by reference herein and relied upon.

In some cases, the outright market for the deferred month or other constituent contract may not be sufficiently active to provide market data (e.g., bid-offer data) and/or trade data. Spread instruments involving such contracts may nonetheless be made available by the exchange. The market data from the spread instruments may then be used to determine a settlement price for the constituent contract. The settlement price may be determined, for example, through a boundary constraint-based technique based on the market data (e.g., bid-offer data) for the spread instrument, as described in U.S. Patent Publication No. 2015/0073962 entitled "Boundary Constraint-Based Settlement in Spread Markets", the entire disclosure of which is incorporated by reference herein and relied upon. Settlement price determination techniques may be implemented to cover calendar month spread instruments having different deferred month contracts.

Referring again to data transaction processing systems, a system may depend on certain rules, logic, and inter-related objects and data. In technical and computing environments, a system may calculate values for multiple objects subject to rules, e.g., business or environment logic, associated with the objects. Certain object types may also depend on other object types. For example, a computing environment may include multiple objects of different types, e.g., base objects and composite objects. A composite object as used herein is an object whose value depends on, is related to, or is influenced by, the values of other objects, such as base objects or other composite objects. For example, a composite object may involve transactions between multiple, e.g., two, base objects. Or, a composite object may define a relationship between other objects. Thus, composite objects depend on the values of other system objects. In one embodiment, a composite object involves or defines a transaction or relationship between at least two other objects. For example, a composite object involves or defines a transaction or relationship between two base objects. A base object may represent an outright order associated with a financial instrument, and a composite object may represent a spread order associated with a financial instrument.

II. Computing Environment

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 162 and/or local area network 160 and computer devices 150, 152, 154, 156 and 158, as described herein, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
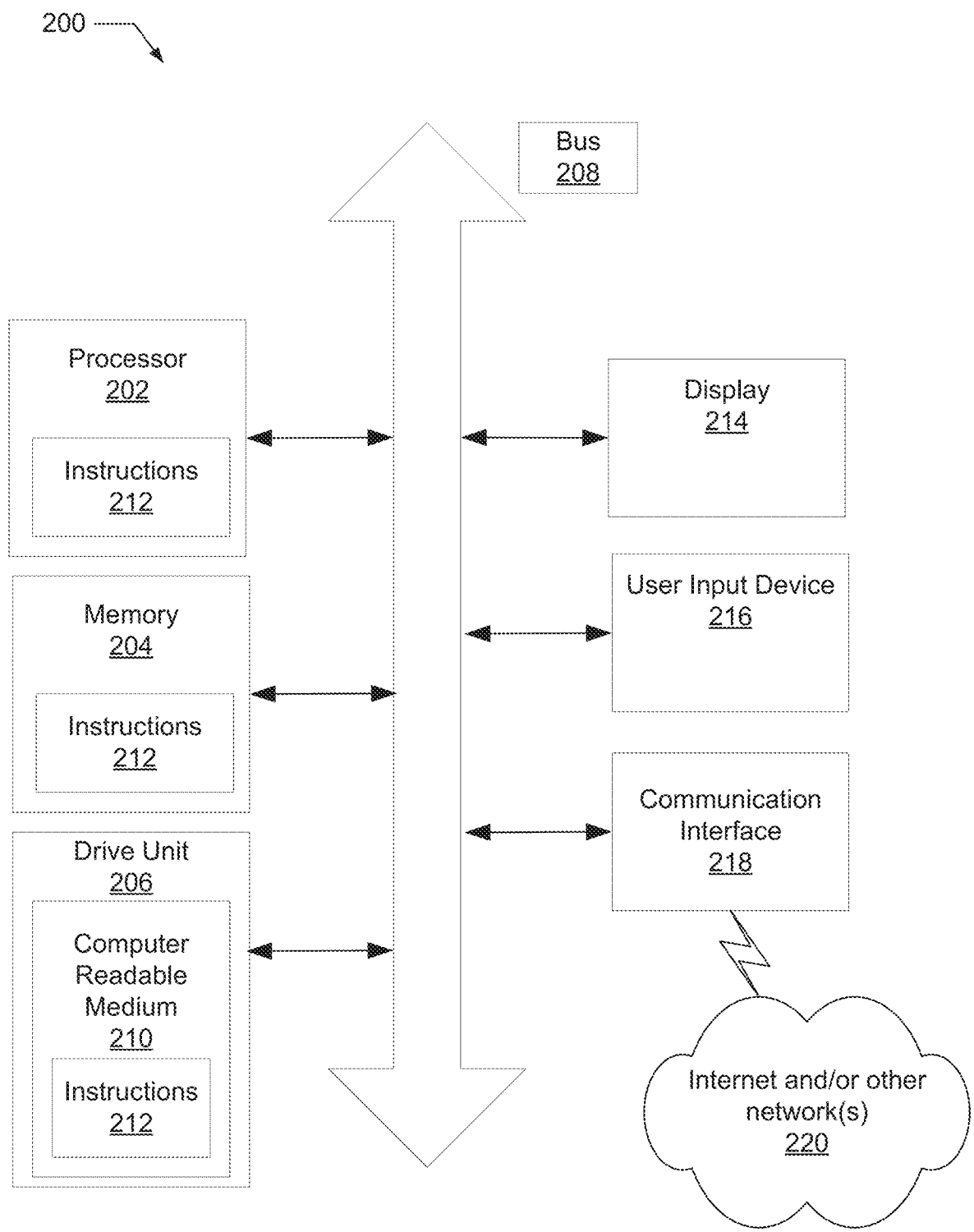
FIG. 2 depicts a general computer system, according to some embodiments.

The exchange computer system 100 may be implemented with one or more mainframe, desktop or other computers, such as the example computer 200 described herein with respect to FIG. 2. A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, trade database 108 may store information identifying the time that a trade took place and the contract price.

An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users. For example, the market data module 112 may prepare the market data feeds described herein.

A risk management module 114 may be included to compute and determine a user's risk utilization in relation to the user's defined risk thresholds. The risk management module 114 may also be configured to determine risk assessments or exposure levels in connection with positions held by a market participant. The risk management module 114 may be configured to administer, manage or maintain one or more margining mechanisms implemented by the exchange computer system 100. Such administration, management or maintenance may include managing a number of database records reflective of margin accounts of the market participants. In some embodiments, the risk management module 114 implements one or more aspects of the disclosed embodiments, including, for instance, principal component analysis (PCA) based margining, in connection with interest rate swap (IRS) portfolios, as described herein.

A message management module 116 may be included to, among other things, receive, and extract orders from, electronic data transaction request messages. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol ("TCP"), to provide the content of the message for further processing by the exchange computer system.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the Market Segment Gateway ("MSG") that is the point of ingress/entry and/or egress/departure for all transactions, i.e., the network traffic/packets containing the data therefore), message type (e.g., new, modify, cancel), and the number of matches generated by a message. Order or message characteristics may also include market participant side (e.g., buyer or seller) or time in force (e.g., a good until end of day order that is good for the full trading day, a good until canceled ordered that rests on the order book until matched, or a fill or kill order that is canceled if not filled immediately, or a fill and kill order (FOK) that is filled to the maximum amount possible based on the state of the order book at the time the FOK order is processed, and any remaining or unfilled/unsatisfied quantity is not stored on the books or allowed to rest).

An order processing module 118 may be included to decompose delta-based, spread instrument, bulk and other types of composite orders for processing by the order book module 110 and/or the match engine module 106. The order processing module 118 may also be used to implement one or more procedures related to clearing an order. The order may be communicated from the message management module 116 to the order processing module 118. The order processing module 118 may be configured to interpret the communicated order, and manage the order characteristics, other information, and associated actions as they are processed through an order book module 110 and eventually transacted on an electronic market. For example, the order processing module 118 may store the order characteristics and other content and execute the associated actions. In an embodiment, the order processing module 118 may execute an associated action of placing the order into an order book for an electronic trading system managed by the order book module 110. In an embodiment, placing an order into an order book and/or into an electronic trading system may be considered a primary action for an order. The order processing module 118 may be configured in various arrangements, and may be configured as part of the order book module 110, part of the message management module 116, or as an independent functioning module.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 120. A settlement module 120 (or settlement processor or other payment processor) may be included to provide one or more functions related to settling or otherwise administering transactions cleared by the exchange. Settlement module 120 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 120 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 120 may be used to determine a mark to market amount on a daily basis during the term of the financial instrument. Such determinations may also be made on a settlement date for the financial instrument for the purposes of final settlement.

In some embodiments, the settlement module 120 may be integrated to any desired extent with one or more of the other modules or processors of the exchange computer system 100. For example, the settlement module 120 and the risk management module 114 may be integrated to any desired extent. In some cases, one or more margining procedures or other aspects of the margining mechanism(s) may be implemented by the settlement module 120.

Tracking module 122 may be included to generate a tracking financial instrument, which can be listed by the exchange computing system or made available for trading by the exchange computing system, and which closely and automatically tracks a target financial instrument, e.g., a target futures contract. The tracking financial instrument may be a financial instrument that can track a financial instrument specified by a user of the exchange computing system. In one embodiment, a trader may be able to specify a target futures contract, and the tracking module 122 dynamically and automatically generates a tracking financial instrument that automatically, i.e., without further user intervention, tracks the target futures contract. A tracking financial instrument that "tracks" a target futures contract may be understood to mimic the target futures contract so closely that the performance of the tracking financial instrument and the performance of the target futures contract is indistinguishable. In one embodiment, the performance may be compared by comparing actual returns, or by calculating a tracking error. Or, the performances may be graphed, e.g., on a display screen of a computer, and compared. It should be appreciated that in one embodiment, a user may define the metrics and criteria that determine how closely a tracking financial instrument tracks a target futures contract.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s). It should be appreciated that concurrent processing limits may be defined by or imposed separately or in combination on one or more of the trading system components.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, 156 and 158 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet based compute device, or other wireless device, may communicate with the LAN 160 and/or the Internet 162 via radio waves, such as via WiFi, Bluetooth and/or a cellular telephone based data communications protocol. PDA 158 may also communicate with exchange computer system 100 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 166 which may maintain a market by providing constant bid and offer prices for a derivative or security to the exchange computer system 100, such as via one of the exemplary computer devices depicted. The exchange computer system 100 may also exchange information with other match or trade engines, such as trade engine 170. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 154 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring now to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed herein, such as processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g. via computer executable software code, but whose form, e.g. the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

It should be appreciated that the disclosed embodiments may be applicable to other types of messages depending upon the implementation. Further, the messages may comprise one or more data packets, datagrams or other collection of data formatted, arranged configured and/or packaged in a particular one or more protocols, e.g., the FIX protocol, TCP/IP, Ethernet, etc., suitable for transmission via a network 214 as was described, such as the message format and/or protocols described in U.S. Pat. No. 7,831,491 and U.S. Patent Publication No. 2005/0096999 A1, both of which are incorporated by reference herein in their entireties and relied upon. Further, the disclosed message management system may be implemented using an open message standard implementation, such as FIX, FIX Binary, FIX/FAST, or by an exchange-provided API.

The embodiments described herein may utilize trade related electronic messages such as mass quote messages, individual order messages, modification messages, cancellation messages, etc., so as to enact trading activity in an electronic market. The trading entity and/or market participant may have one or multiple trading terminals associated with the session. Furthermore, the financial instruments may be financial derivative products. Derivative products may include futures contracts, options on futures contracts, futures contracts that are functions of or related to other futures contracts, swaps, swaptions, or other financial instruments that have their price related to or derived from an underlying product, security, commodity, equity, index, or interest rate product. In one embodiment, the orders are for options contracts that belong to a common option class. Orders may also be for baskets, quadrants, other combinations of financial instruments, etc. The option contracts may have a plurality of strike prices and/or comprise put and call contracts. A mass quote message may be received at an exchange. As used herein, an exchange computing system 100 includes a place or system that receives and/or executes orders.

In an embodiment, a plurality of electronic messages is received from the network. The plurality of electronic messages may be received at a network interface for the electronic trading system. The plurality of electronic messages may be sent from market participants. The plurality of electronic messages may include order characteristics and be associated with actions to be executed with respect to an order that may be extracted from the order characteristics. The action may involve any action as associated with transacting the order in an electronic trading system. The actions may involve placing the orders within a particular market and/or order book of a market in the electronic trading system.

In an embodiment, an incoming transaction may be received. The incoming transaction may be from, and therefore associated with, a market participant of an electronic market managed by an electronic trading system. The transaction may involve an order as extracted from a received message, and may have an associated action. The actions may involve placing an order to buy or sell a financial product in the electronic market, or modifying or deleting such an order. In an embodiment, the financial product may be based on an associated financial instrument which the electronic market is established to trade.

In an embodiment, the action associated with the transaction is determined. For example, it may be determined whether the incoming transaction comprises an order to buy or sell a quantity of the associated financial instrument or an order to modify or cancel an existing order in the electronic market. Orders to buy or sell and orders to modify or cancel may be acted upon differently by the electronic market. For example, data indicative of different characteristics of the types of orders may be stored.

In an embodiment, data relating to the received transaction is stored. The data may be stored in any device, or using any technique, operable to store and provide recovery of data. For example, a memory 204 or computer readable medium 210, may be used to store data, as is described with respect to FIG. 2 in further detail herein. Data may be stored relating received transactions for a period of time, indefinitely, or for a rolling most recent time period such that the stored data is indicative of the market participant's recent activity in the electronic market.

If and/or when a transaction is determined to be an order to modify or cancel a previously placed, or existing, order, data indicative of these actions may be stored. For example, data indicative of a running count of a number or frequency of the receipt of modify or cancel orders from the market participant may be stored. A number may be a total number of modify or cancel orders received from the market participant, or a number of modify or cancel orders received from the market participant over a specified time. A frequency may be a time based frequency, as in a number of cancel or modify orders per unit of time, or a number of cancel or modify orders received from the market participant as a percentage of total transactions received from the participant, which may or may not be limited by a specified length of time.

If and/or when a transaction is determined to be an order to buy or sell a financial product, or financial instrument, other indicative data may be stored. For example, data indicative of quantity and associated price of the order to buy or sell may be stored.

Data indicative of attempts to match incoming orders may also be stored. The data may be stored in any device, or using any technique, operable to store and provide recovery of data. For example, a memory 204 or computer readable medium 210, may be used to store data, as is described with respect to FIG. 2. The acts of the process as described herein may also be repeated. As such, data for multiple received transactions for multiple market participants may be stored and used as describe herein.

The order processing module 118 may also store data indicative of characteristics of the extracted orders. For example, the order processing module may store data indicative of orders having an associated modify or cancel action, such as by recording a count of the number of such orders associated with particular market participants. The order processing module may also store data indicative of quantities and associated prices of orders to buy or sell a product placed in the market order book 110, as associated with particular market participants.

Also, the order processing module 118 may be configured to calculate and associate with particular orders a value indicative of an associated market participant's market activity quality, which is a value indicative of whether the market participant's market activity increases or tends to increase liquidity of a market. This value may be determined based on the price of the particular order, previously stored quantities of orders from the associated market participant, the previously stored data indicative of previously received orders to modify or cancel as associated with the market participant, and previously stored data indicative of a result of the attempt to match previously received orders stored in association with the market participant. The order processing module 118 may determine or otherwise calculate scores indicative of the quality value based on these stored extracted order characteristics.

Further, electronic trading systems may perform actions on orders placed from received messages based on various characteristics of the messages and/or market participants associated with the messages. These actions may include matching the orders either during a continuous auction process, or at the conclusion of a collection period during a batch auction process. The matching of orders may be by any technique.

The matching of orders may occur based on a priority indicated by the characteristics of orders and market participants associated with the orders. Orders having a higher priority may be matched before orders of a lower priority. Such priority may be determined using various techniques. For example, orders that were indicated by messages received earlier may receive a higher priority to match than orders that were indicated by messages received later. Also, scoring or grading of the characteristics may provide for priority determination. Data indicative of order matches may be stored by a match engine and/or an order processing module 118.

Order Book Object Data Structures

In one embodiment, the messages and/or values received for each object may be stored in queues according to value and/or priority techniques implemented by an exchange computing system 100. FIG. 3A illustrates an example data structure 300, which may be stored in a memory or other storage device, such as the memory 204 or storage device 206 described with respect to FIG. 2, for storing and retrieving messages related to different values for the same action for an object. For example, data structure 300 may be a set of queues or linked lists for multiple values for an action, e.g., bid, on an object. Data structure 300 may be implemented as a database. It should be appreciated that the system may store multiple values for the same action for an object, for example, because multiple users submitted messages to buy specified quantities of an object at different values. Thus, in one embodiment, the exchange computing system may keep track of different orders or messages for buying or selling quantities of objects at specified values.

Although the present application contemplates using queue data structures for storing messages in a memory, the implementation may involve additional pointers, i.e., memory address pointers, or linking to other data structures. Incoming messages may be stored at an identifiable memory address. The transaction processor can traverse messages in order by pointing to and retrieving different messages from the different memories. Thus, messages that may be depicted sequentially, e.g., in FIG. 3B below, may actually be stored in memory in disparate locations. The software programs implementing the transaction processing may retrieve and process messages in sequence from the various disparate (e.g., random) locations. Thus, in one embodiment, each queue may store different values, which could represent prices, where each value points to or is linked to the messages (which may themselves be stored in queues and sequenced according to priority techniques, such as prioritizing by value) that will match at that value. For example, as shown in FIG. 3A, all of the values relevant to executing an action at different values for an object are stored in a queue. Each value in turn points to, e.g., a linked list or queue logically associated with the values. The linked list stores the messages that instruct the exchange computing system to buy specified quantities of the object at the corresponding value.

The sequence of the messages in the message queues connected to each value may be determined by exchange implemented priority techniques. For example, in FIG. 3A, messages M1, M2, M3 and M4 are associated with performing an action (e.g., buying or selling) a certain number of units (may be different for each message) at Value 1. M1 has priority over M2, which has priority over M3, which has priority over M4. Thus, if a counter order matches at Value 1, the system fills as much quantity as possible associated with M1 first, then M2, then M3, and then M4.

In the illustrated examples, the values may be stored in sequential order, and the best or lead value for a given queue may be readily retrievable by and/or accessible to the disclosed system. Thus, in one embodiment, the value having the best priority may be illustrated as being in the topmost position in a queue, although the system may be configured to place the best priority message in some other predetermined position. In the example of FIG. 3A, Value 1 is shown as being the best value or lead value, or the top of the book value, for an example Action.

A lead acquisition value may be the best or lead value in an acquisition queue of an order book object, and a lead relinquish value may be the best or lead value in a relinquish queue of the order book object.

Figure 3B:
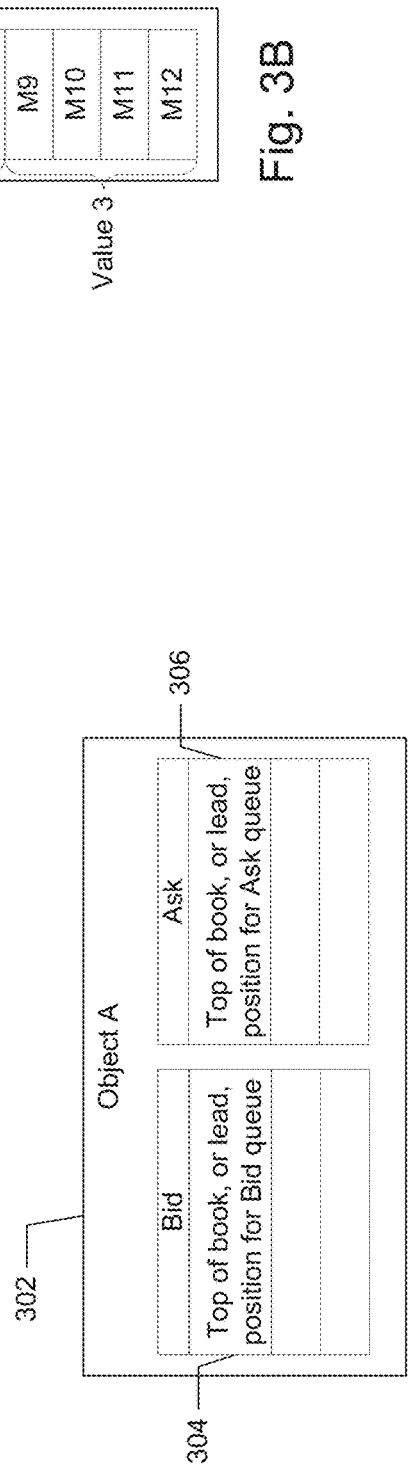
FIG. 3B depicts another storage data structure, according to some embodiments.
Figure 3A:
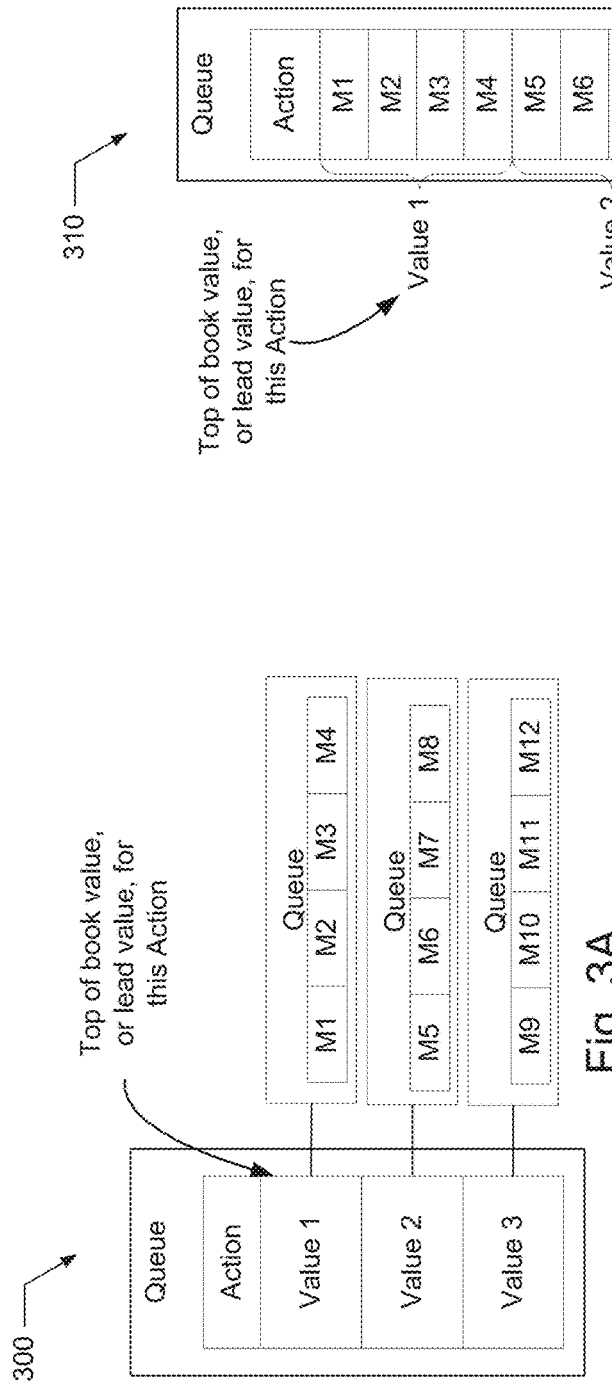
FIG. 3A depicts a storage data structure, according to some embodiments.

FIG. 3B illustrates an example alternative data structure 310 for storing and retrieving messages and related values. It should be appreciated that matches occur based on values, and so all the messages related to a given value may be prioritized over all other messages related to a different value. As shown in FIG. 3B, the messages may be stored in one queue and grouped by values according to the hierarchy of the values. The hierarchy of the values may depend on the action to be performed.

For example, if a queue is a sell queue (e.g., the Action is Sell), the lowest value may be given the best priority and the highest value may be given the lowest priority. Thus, as shown in FIG. 3B, if Value 1 is lower than Value 2 which is lower than Value 3, Value 1 messages may be prioritized over Value 2, which in turn may be prioritized over Value 3.

Within Value 1, M1 is prioritized over M2, which in turn is prioritized over M3, which in turn is prioritized over M4. Within Value 2, M5 is prioritized over M6, which in turn is prioritized over M7, which in turn is prioritized over M8. Within Value 3, M9 is prioritized over M10, which in turn is prioritized over M11, which in turn is prioritized over M12.

Alternatively, the messages may be stored in a tree-node data structure that defines the priorities of the messages. In one embodiment, the messages may make up the nodes.

In one embodiment, the system may traverse through a number of different values and associated messages when processing an incoming message. Traversing values may involve the processor loading each value, checking that value and deciding whether to load another value, i.e., by accessing the address pointed at by the address pointer value. In particular, referring to FIG. 3B, if the queue is for selling an object for the listed Values 1, 2 and 3 (where Value 1 is lower than Value 2 which is lower than Value 3), and if the system receives an incoming aggressing order to buy quantity X at a Value 4 that is greater than Values 1, 2, and 3, the system will fill as much of quantity X as possible by first traversing through the messages under Value 1 (in sequence M1, M2, M3, M4). If any of the quantity of X remains, the system traverses down the prioritized queue until all of the incoming order is filled (e.g., all of X is matched) or until all of the quantities of M1 through M12 are filled. Any remaining, unmatched quantity remains on the books, e.g., as a resting order at Value 4, which was the entered value or the message's value.

The system may traverse the queues and check the values in a queue, and upon finding the appropriate value, may locate the messages involved in making that value available to the system. When an outright message value is stored in a queue, and when that outright message is involved in a trade or match, the system may check the queue for the value, and then may check the data structure storing messages associated with that value.

In one embodiment, an exchange computing system may convert all financial instruments to objects. In one embodiment, an object may represent the order book for a financial instrument. Moreover, in one embodiment, an object may be defined by two queues, one queue for each action that can be performed by a user on the object. For example, an order book converted to an object may be represented by an Ask queue and a Bid queue. Resting messages or orders associated with the respective financial instrument may be stored in the appropriate queue and recalled therefrom.

In one embodiment, the messages associated with objects may be stored in specific ways depending on the characteristics of the various messages and the states of the various objects in memory. For example, a system may hold certain resting messages in queue until the message is to be processed, e.g., the message is involved in a match. The order, sequence or priority given to messages may depend on the characteristics of the message. For example, in certain environments, messages may indicate an action that a computer in the system should perform. Actions may be complementary actions, or require more than one message to complete. For example, a system may be tasked with matching messages or actions contained within messages. The messages that are not matched may be queued by the system in a data queue or other structure, e.g., a data tree having nodes representing messages or orders.

The queues are structured so that the messages are stored in sequence according to priority. Although the embodiments are disclosed as being implemented in queues, it should be understood that different data structures such as for example linked lists or trees may also be used.

The system may include separate data structures, e.g., queues, for different actions associated with different objects within the system. For example, in one embodiment, the system may include a queue for each possible action that can be performed on an object. The action may be associated with a value. The system prioritizes the actions based in part on the associated value.

Figure 3C:
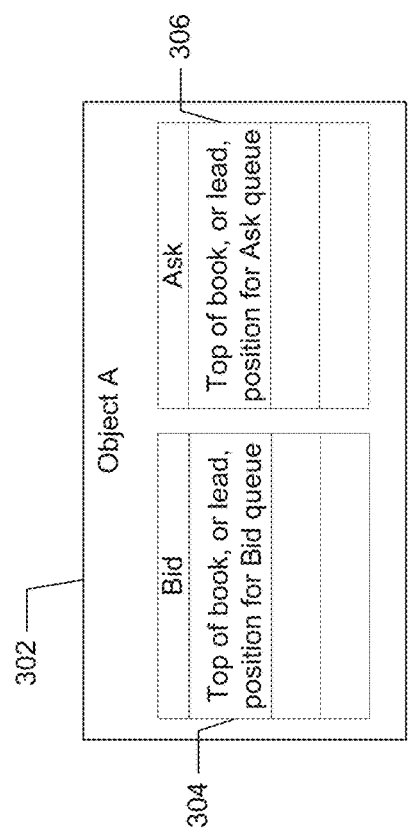
FIG. 3C depicts yet another data structure, according to some embodiments.

For example, as shown in FIG. 3C, the order book module of a computing system may include several paired queues, such as queues Bid and Ask for an object 302 (e.g., Object A). The system may include two queues, or one pair of queues, for each object that is matched or processed by the system. In one embodiment, the system stores messages in the queues that have not yet been matched or processed. FIG. 3C may be an implementation of the data structures disclosed in FIGS. 3A and/or 3B. Each queue may have a top of book, or lead, position, such as positions 304 and 306, which stores data that is retrievable.

The queues may define the priority or sequence in which messages are processed upon a match event. For example, two messages stored in a queue may represent performing the same action at the same value. When a third message is received by the system that represents a matching action at the same value, the system may need to select one of the two waiting, or resting, messages as the message to use for a match. Thus, when multiple messages can be matched at the same value, the exchange may have a choice or some flexibility regarding the message that is matched. The queues may define the priority in which orders that are otherwise equivalent (e.g., same action for the same object at the same value) are processed.

The system may include a pair of queues for each object, e.g., a bid and ask queue for each object. Each queue may be for example implemented utilizing the data structure of FIG. 3B. The exchange may be able to specify the conditions upon which a message for an object should be placed in a queue. For example, the system may include one queue for each possible action that can be performed on an object. The system may be configured to process messages that match with each other. In one embodiment, a message that indicates performing an action at a value may match with a message indicating performing a corresponding action at the same value. Or, the system may determine the existence of a match when messages for the same value exist in both queues of the same object. The messages may be received from the same or different users or traders.

The queues illustrated in FIG. 3C hold or store messages received by a computing exchange, e.g., messages submitted by a user to the computing exchange, and waiting for a proper match. It should be appreciated that the queues may also hold or store implieds, e.g., implied messages generated by the exchange system, such as messages implied in or implied out as described herein. The system thus adds messages to the queues as they are received, e.g., messages submitted by users, or generated, e.g., implied messages generated by the exchanges. The sequence or prioritization of messages in the queues is based on information about the messages and the overall state of the various objects in the system.

When the data transaction processing system is implemented as an exchange computing system, as discussed above, different client computers submit electronic data transaction request messages to the exchange computing system. Electronic data transaction request messages include requests to perform a transaction on a data object, e.g., at a value for a quantity. The exchange computing system includes a transaction processor, e.g., a hardware matching processor or match engine, that matches, or attempts to match, pairs of messages with each other. For example, messages may match if they contain counter instructions (e.g., one message includes instructions to buy, the other message includes instructions to sell) for the same product at the same value. In some cases, depending on the nature of the message, the value at which a match occurs may be the submitted value or a better value. A better value may mean higher or lower value depending on the specific transaction requested. For example, a buy order may match at the submitted buy value or a lower (e.g., better) value. A sell order may match at the submitted sell value or a higher (e.g., better) value.

Transaction Processor Data Structures

Figure 4:
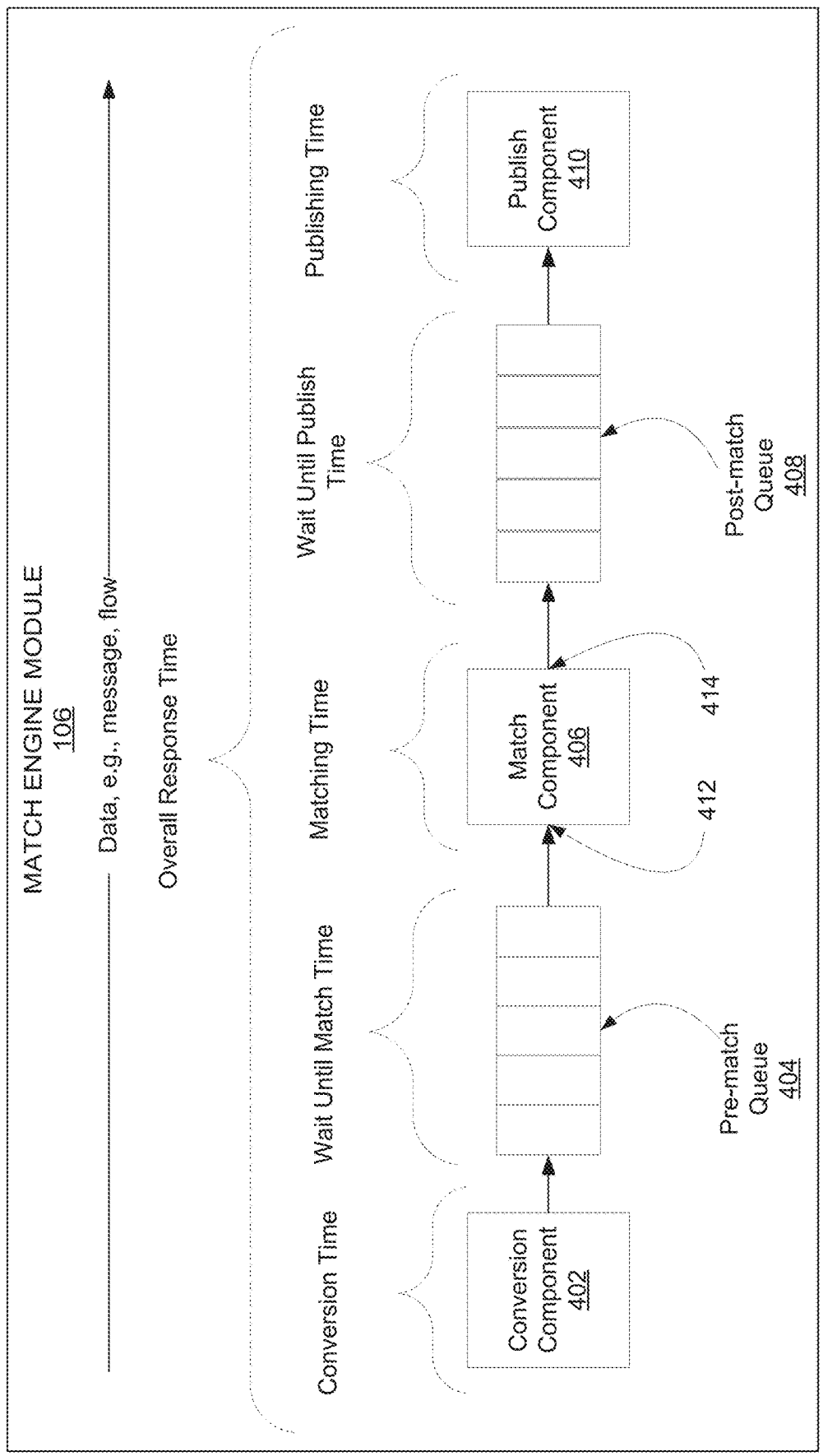
FIG. 4 depicts a match engine module, according to some embodiments.

FIG. 4 illustrates an example embodiment of a data structure used to implement match engine module 106. Match engine module 106 may include a conversion component 402, pre-match queue 404, match component 406, post-match queue 408 and publish component 410.

Although the embodiments are disclosed as being implemented in queues, it should be understood that different data structures, such as for example linked lists or trees, may also be used. Although the application contemplates using queue data structures for storing messages in a memory, the implementation may involve additional pointers, i.e., memory address pointers, or linking to other data structures. Thus, in one embodiment, each incoming message may be stored at an identifiable memory address. The transaction processing components can traverse messages in order by pointing to and retrieving different messages from the different memories. Thus, messages that may be processed sequentially in queues may actually be stored in memory in disparate locations. The software programs implementing the transaction processing may retrieve and process messages in sequence from the various disparate (e.g., random) locations.

The queues described herein may, in one embodiment, be structured so that the messages are stored in sequence according to time of receipt, e.g., they may be first in first out (FIFO) queues.

The match engine module 106 may be an example of a transaction processing system. The pre-match queue 404 may be an example of a pre-transaction queue. The match component 406 may be an example of a transaction component. The post-match queue 408 may be an example of a post-transaction queue. The publish component 410 may be an example of a distribution component. The transaction component may process messages and generate transaction component results.

It should be appreciated that match engine module 106 may not include all of the components described herein. For example, match engine module 106 may only include pre-match queue 404 and match component 406. In one embodiment, the latency detection system may detect how long a message waits in a pre-match queue 404 (e.g., latency), and compares the latency to the maximum allowable latency associated with the message.

In one embodiment, the publish component may be a distribution component that can distribute data to one or more market participant computers. In one embodiment, match engine module 106 operates according to a first in, first out (FIFO) ordering. The conversion component 402 converts or extracts a message received from a trader via the Market Segment Gateway or MSG into a message format that can be input into the pre-match queue 404.

Messages from the pre-match queue may enter the match component 406 sequentially and may be processed sequentially. In one regard, the pre-transaction queue, e.g., the pre-match queue, may be considered to be a buffer or waiting spot for messages before they can enter and be processed by the transaction component, e.g., the match component. The match component matches orders, and the time a messages spends being processed by the match component can vary, depending on the contents of the message and resting orders on the book. Thus, newly received messages wait in the pre-transaction queue until the match component is ready to process those messages. Moreover, messages are received and processed sequentially or in a first-in, first-out (FIFO) methodology. The first message that enters the pre-match or pre-transaction queue will be the first message to exit the pre-match queue and enter the match component. In one embodiment, there is no out-of-order message processing for messages received by the transaction processing system. The pre-match and post-match queues are, in one embodiment, fixed in size, and any messages received when the queues are full may need to wait outside the transaction processing system or be re-sent to the transaction processing system.

The match component 406 processes an order or message, at which point the transaction processing system may consider the order or message as having been processed. The match component 406 may generate one message or more than one message, depending on whether an incoming order was successfully matched by the match component. An order message that matches against a resting order in the order book may generate dozens or hundreds of messages. For example, a large incoming order may match against several smaller resting orders at the same price level. For example, if many orders match due to a new order message, the match engine needs to send out multiple messages informing traders which resting orders have matched. Or, an order message may not match any resting order and only generate an acknowledgement message. Thus, the match component 406 in one embodiment will generate at least one message, but may generate more messages, depending upon the activities occurring in the match component. For example, the more orders that are matched due to a given message being processed by the match component, the more time may be needed to process that message. Other messages behind that given message will have to wait in the pre-match queue.

Messages resulting from matches in the match component 406 enter the post-match queue 408. The post-match queue may be similar in functionality and structure to the pre-match queue discussed above, e.g., the post-match queue is a FIFO queue of fixed size. As illustrated in FIG. 4, a difference between the pre- and post-match queues may be the location and contents of the structures, namely, the pre-match queue stores messages that are waiting to be processed, whereas the post-match queue stores match component results due to matching by the match component. The match component receives messages from the pre-match queue, and sends match component results to the post-match queue. In one embodiment, the time that results messages, generated due to the transaction processing of a given message, spend in the post-match queue is not included in the latency calculation for the given message.

Messages from the post-match queue 408 enter the publish component 410 sequentially and are published via the MSG sequentially. Thus, the messages in the post-match queue 408 are an effect or result of the messages that were previously in the pre-match queue 404. In other words, messages that are in the pre-match queue 404 at any given time will have an impact on or affect the contents of the post-match queue 408, depending on the events that occur in the match component 406 once the messages in the pre-match queue 404 enter the match component 406.

As noted above, the match engine module 106 in one embodiment operates in a first in first out (FIFO) scheme. In other words, the first message that enters the match engine module 106 is the first message that is processed by the match engine module 106. Thus, the match engine module 106 in one embodiment processes messages in the order the messages are received. In FIG. 4, as shown by the data flow arrow, data is processed sequentially by the illustrated structures from left to right, beginning at the conversion component 402, to the pre-match queue, to the match component 406, to the post-match queue 408, and to the publish component 410. The overall transaction processing system operates in a FIFO scheme such that data flows from element 402 to 404 to 406 to 408 to 410, in that order. If any one of the queues or components of the transaction processing system experiences a delay, that creates a backlog for the structures preceding the delayed structure. For example, if the match or transaction component is undergoing a high processing volume, and if the pre-match or pre-transaction queue is full of messages waiting to enter the match or transaction component, the conversion component may not be able to add any more messages to the pre-match or pre-transaction queue.

Messages wait in the pre-match queue. The time a message waits in the pre-match queue depends upon how many messages are ahead of that message (i.e., earlier messages), and how much time each of the earlier messages spends being serviced or processed by the match component. Messages also wait in the post-match queue. The time a message waits in the post-match queue depends upon how many messages are ahead of that message (i.e., earlier messages), and how much time each of the earlier messages spends being serviced or processed by the publish component. These wait times may be viewed as a latency that can affect a market participant's trading strategy.

After a message is published (after being processed by the components and/or queues of the match engine module), e.g., via a market data feed, the message becomes public information and is publicly viewable and accessible. Traders consuming such published messages may act upon those message, e.g., submit additional new input messages to the exchange computing system responsive to the published messages.

The match component attempts to match aggressing or incoming orders against resting orders. If an aggressing order does not match any resting orders, then the aggressing order may become a resting order, or an order resting on the books. For example, if a message includes a new order that is specified to have a one-year time in force, and the new order does not match any existing resting order, the new order will essentially become a resting order to be matched (or attempted to be matched) with some future aggressing order. The new order will then remain on the books for one year. On the other hand, an order specified as a fill or kill (e.g., if the order cannot be filled or matched with an order currently resting on the books, the order should be canceled) will never become a resting order, because it will either be filled or matched with a currently resting order, or it will be canceled. The amount of time needed to process or service a message once that message has entered the match component may be referred to as a service time. The service time for a message may depend on the state of the order books when the message enters the match component, as well as the contents, e.g., orders, that are in the message.

In one embodiment, orders in a message are considered to be "locked in", or processed, or committed, upon reaching and entering the match component. If the terms of the aggressing order match a resting order when the aggressing order enters the match component, then the aggressing order will be in one embodiment guaranteed to match.

As noted above, the latency experienced by a message, or the amount of time a message spends waiting to enter the match component, depends upon how many messages are ahead of that message (i.e., earlier messages), and how much time each of the earlier messages spends being serviced or processed by the match component. The amount of time a match component spends processing, matching or attempting to match a message depends upon the type of message, or the characteristics of the message. The time spent inside the processor may be considered to be a service time, e.g., the amount of time a message spends being processed or serviced by the processor.

The number of matches or fills that may be generated in response to a new order message for a financial instrument will depend on the state of the data object representing the electronic marketplace for the financial instrument. The state of the match engine can change based on the contents of incoming messages.

It should be appreciated that the match engine's overall latency is in part a result of the match engine processing the messages it receives. The match component's service time may be a function of the message type (e.g., new, modify, cancel), message arrival rate (e.g., how many orders or messages is the match engine module receiving, e.g., messages per second), message arrival time (e.g., the time a message hits the inbound MSG or market segment gateway), number of fills generated (e.g., how many fills were generated due to a given message, or how many orders matched due to an aggressing or received order), or number of Mass Quote entries (e.g., how many of the entries request a mass quote).

In one embodiment, the time a message spends: being converted in the conversion component 402 may be referred to as a conversion time; waiting in the pre-match queue 404 may be referred to as a wait until match time; being processed or serviced in the match component 406 may be referred to as a matching time; waiting in the post-match queue 408 may be referred to as a wait until publish time; and being processed or published via the publish component 410 may be referred to as a publishing time.

It should be appreciated that the latency may be calculated, in one embodiment, as the sum of the conversion time and wait until match time. Or, the system may calculate latency as the sum of the conversion time, wait until match time, matching time, wait until publish time, and publishing time. In systems where some or all of those times are negligible, or consistent, a measured latency may only include the sum of some of those times. Or, a system may be designed to only calculate one of the times that is the most variable, or that dominates (e.g., percentage wise) the overall latency. For example, some market participants may only care about how long a newly sent message that is added to the end of the pre-match queue will spend waiting in the pre-match queue. Other market participants may care about how long that market participant will have to wait to receive an acknowledgement from the match engine that a message has entered the match component. Yet other market participants may care about how much time will pass from when a message is sent to the match engine's conversion component to when match component results exit or egress from the publish component.

Tracking Module

Figure 5:
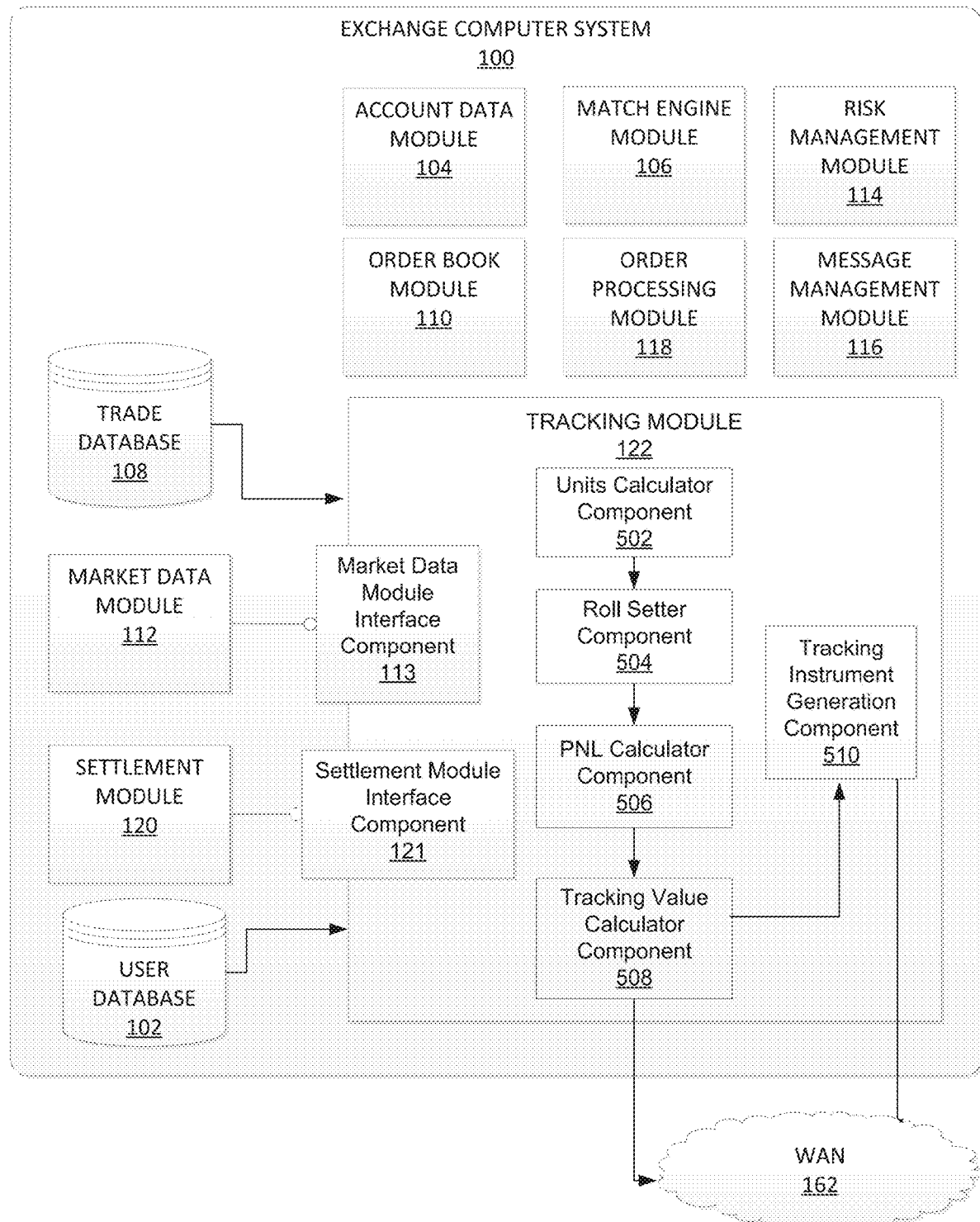
FIG. 5 depicts a block diagram of an exchange computing system including a tracking module, according to some embodiments.

Referring now to FIG. 5, there are depicted aspects of a system architecture in a block-diagram form and data flow between and among various system components for operation of one embodiment of an exchange computing system 100 including a tracking module 122 for determining a tracking value for a futures contract, wherein the futures contract may be referred to as a target futures contract. For example, the target futures contract may be a Corn Futures Contract (CME GLOBEX® product code ZC), or the target futures contract may be an S&P 500 Futures Contract (CME GLOBEX® product code SP). In one embodiment, the exchange computing system may automatically generate a tracking financial instrument having a value that is determined from a calculated tracking value. In one embodiment, the tracking financial instrument is introduced into a financial instrument exchange market via an exchange computing system server, where it is automatically listed for trading.

In one implementation, the tracking module 122 may be coupled to, or include, a market data module interface component 113 configured to query and/or receive market data from the market data module 112.

In one embodiment, the tracking module 122 may be coupled to, or include, a settlement module interface component 121 configured to query and/or receive settlement prices from the settlement data module 120.

The tracking module 122 additionally may be coupled to and retrieve data from exchange computing system 100 databases such as the trade database 108 and/or user database 102.

Tracking module 122 includes units calculator component 502, roll setter component 504, PNL calculator component 506, tracking value calculator component 508, and/or tracking instrument generation component 510. Tracking module 122 may be in communication with one or more other components of the exchange computing system 100, and may receive and/or access information which may be stored across various other modules in the exchange computing system 100, such as the order book module 110 and/or the market data module 112. Tracking module 122 may receive or access a contract specification for the target futures contract. A contract specification for a financial instrument may specify or define attributes of the financial instrument, such as an underlying asset, the quantity of the asset, delivery location, and delivery date. The futures contract specification may also specify the contract unit (e.g., 5,000 bushels for the Corn Futures Contract), price quotation (e.g., cents per bushel for the Corn Futures Contract), the different listed contracts/maturities (e.g., March (H), May (K), July (N), September (U) & December (Z) for the Corn Futures Contract), and the settlement method (cash settled, or delivery).

The tracking module 122 may determine, based on the target futures contract specification, a multiplier, which is the number by which a settlement price is multiplied to obtain the full value of the target futures contract. For example, if the target futures contract is a Corn Futures Contract, the settlement price may be listed as cents per bushel, and one Corn Futures Contract may include 5,000 bushels of corn. In that case, the multiplier is 5,000.

In another example, if the target futures contract is an S&P 500 Futures Contract, the settlement price may be listed as unitless, and one S&P 500 Futures Contract may be specified as $250×S&P 500 Index. In that case, the multiplier is 250.

The tracking module 122 may determine, based on the target futures contract specification, a FPD_Nearby, which is the first position date of the nearby month, and a FPD_Deferred, which is the first position date of the deferred month. The first position date is determined based on the specification of the target futures contract. In one embodiment, the tracking module 122 may traverse all the different contract specifications to extract, e.g., by parsing the specifications, or calculating, all the different first position dates. In one embodiment, the tracking module 122 may calculate first position dates for each expiry date for a target futures contract. That way, the tracking module 122 can generate a tracking value, as discussed herein, for each futures contract listed by the exchange computing system 100.

The tracking module 122 may also receive historical pricing/market data information over a timeframe for the different listed months, e.g., settlement prices at the end of each trading day over the past ten years for every contract month associated with the Corn Futures Contract. For example, the tracking module 122 may receive a plurality of data records for the target futures contract, where each record may be associated with a time, e.g., 5:00 pm on each trading day.

The received data may include, for each trading day:
Settlement_Nearby (settlement price of the nearby (front month) contract), and
Settlement_Deferred (settlement price of the deferred (next month) contract).

As is known in the art, the nearby or front month contract is the contract closest to delivery or cash settlement (depending on the underlying asset), and the deferred/next month contract is the contract following the nearby month contract. For example, for the Corn Futures Contract, if the current date is June, then the nearby month contract is July, and the deferred month contract is September.

Accordingly, the tracking module 122 receives periodic (e.g., daily) historical market data over a timeframe (e.g., past ten years, or since Jan. 1, 1990) for the target futures contract, where each data record is associated with a data/time, or timestamp. For example, the historical data may be data over a timeframe. Data at time [i] may be referred to as Data[i], and data at the time immediately prior to time [i] (e.g., the previous trading day's data, if the data increment/frequency is daily) may be referred to as Data[i−1]. Accordingly, the change in data may be referred to as Data[i]−Data[i−1], e.g., the change in settlement prices between two consecutive trading days may be calculated as Settlement_Nearby[i]−Settlement_Nearby[i−1].

Although the application discusses the changes in settlement prices over different days, a different timeframe/period/update frequency may be used. For example, if hourly data is to be used, the tracking module 112 would receive updated information (e.g., from the market data module) every hour. In other words, the frequency with which market data is updated may vary. In one embodiment, the frequency may be set by a trader, e.g., via a user interface.

Units calculator component 502 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the units calculator component 502 to determine how many units of the target futures contract can be acquired based on a starting/initial capital.

The capital used by the units calculator component 502 may be specified by a trader. For example, a trader may wish to determine an index that tracks the change in a starting capital of $10,000,000 invested in the Corn Futures Contract. In one embodiment, the starting capital may be specified by an administrator of the exchange computing system 100. The starting capital may be specified in dollars, and may be selected based on the value of the target futures contract.

Units calculator component 502 calculates the units of a target futures contract as:

$$\text{Units} = \text{Starting Capital}/(\text{Settlement\_Nearby} * \text{Multiplier}) \quad \text{[Equation 1]}$$

Roll setter component 504 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the roll setter component 504 to determine the value of a roll indicator variable. Roll setter component 504 sets the value of the roll indicator variable as either a zero (not a roll period) or 1 (roll period). As described below, the logic executed by PNL calculator component 506 depends on the output of the roll setter component 504. In one embodiment, the value of the roll indicator determines which month (i.e., nearby or deferred) of the target futures contract should be used as the source of data to calculate a PNL.

Roll setter component 504 sets a value for a roll indicator based on the first position date of the nearby contract (FPD_Nearby). In one embodiment, the roll setter component 504 calculates the value of the first position date for the target futures contract based on the contract specification. The roll indicator may be used to ensure that an underlying commodity of a target futures contract (e.g., corn, or oil) cannot actually be delivered. The roll indicator may be a zero or a 1 depending on the number of days remaining until the first position date. Thus, the roll indicator is set by the roll setter component 504 as a function of the number of days remaining until the first position date. In one embodiment, the number of days remaining until the first position date (which triggers the change in the roll indicator) may be configurable by a trader.

In one embodiment, the roll indicator is used to determine when the settlement prices of the deferred month should be used to determine a PNL, as discussed below. In one embodiment, the roll setter component sets the value of the roll indicator as value 1 a specified number of days (e.g., 1 trading day) before the calculated first position date of the nearby contract. For example, the roll indicator may be set to 1 when the current date is one day (or whatever number of days is specified by the trader) away from (e.g., before) the first position date of the nearby contract. In all other instances, the roll indicator may be set to zero. As discussed herein, the roll indicator determines when the number of units, which is initially computed by the units calculator component 502 using Equation 1 above, is recomputed. In one embodiment, at each roll period as determined by the roll setter component 504, the units traded is recomputed by the units calculator component 502, and the units calculated is carried forward until the next roll period as determined based on the roll setter component 504.

More specifically, the logic executed to determine the tracking value by the tracking module 122 varies based on the roll indicator calculated by the roll setter component 504, e.g.,
  (i) whether the roll indicator for the previous day and the current day are both zero (which may indicate that the target futures contract is not in a roll period);
  (ii) whether the roll indicator for the previous day is zero and the roll indicator for the current day is 1 (which may indicate that the target futures contract is entering a roll period); or
  (iii) whether the roll indicator for the previous day is 1 and the roll indicator for the current day is zero (which may indicate that the target futures contract is exiting from a roll period).

PNL calculator component 506 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the PNL calculator component 506 to determine the profit and loss, wherein the logic executed by the PNL calculator component 506 is based on the value of the roll indicator set by the roll setter component 504.

The PNL of an initial position (e.g., the first data point in a series of data points over a timeframe) may be zero, because there are no losses or gains that are calculated for the first trade of a timeframe. The disclosed tracking module 122 is configured to calculate PNL differently depending on the roll period (e.g., (i), (ii) or (iii) above) indicated by the roll indicator. In one embodiment, the unit calculator may also update the number of units (which again are initially calculated using Equation 1 above) depending on the status of the roll indicator. As discussed below, the PNL calculator component 506 also relies on an interest rate (Interest_Rate), which is the interest rate used by the tracking value calculator component. The interest rate may be the overnight rate, or any other rate deemed to be appropriate. For example, using an incorrect rate would cause a tracking error between the tracking instrument and target futures contract. In one embodiment, a user may be able to specify the rate used as the Interest_Rate by the tracking value calculator component. For example, the Interest_Rate may be the 3 month LIBOR (London Interbank Offered Rate).

More specifically, the following calculations are performed based on the roll indicator:
  (i) When the target futures contract is not in a roll period:
  The units are not recomputed, and they remain the same, and are calculated as:

$$Units[i] = Units[i-1]$$

The interest earned is calculated as:

$$Interest\_Earned[i] = Total\_Capital[i-1] * (Interest\_Rate[i-1]) * (DayCount[i]/360) \quad \text{[Equation 2]}$$

In one embodiment, the first entry (e.g., earliest timestamp) from the historical data samples, the interest earned may be zero. In other words, the very first day out of a timeframe of multiple days, interest will not accrue. The DayCount is the number of days between two trading days. PNL calculator component 506 calculates PNL as:

$$PNL[i] = Units[i-1](Settlement\_Nearby[i] - Settlement\_Nearby[i-1]) * Multiplier \quad \text{[Equation 3]}$$

(ii) When the target futures contract is entering a roll period:
  The interest earned is calculated as:

$$Interest\_Earned[i] = Total\_Capital[i-1] * (Interest\_Rate[i-1]) * (DayCount[i]/360) \quad \text{[Equation 2, repeated]}$$

PNL calculator component 506 calculates PNL as:

$$PNL[i] = Units[i-1](Settlement\_Nearby[i] - Settlement\_Nearby[i-1]) * Multiplier \quad \text{[Equation 3, repeated]}$$

In this situation when the target futures contract is entering a roll period, the units are recomputed:

$$Units[i] = Total\_Capital[i]/(Settlement\_Deferred[i] * Multiplier) \quad \text{[Equation 4]}$$

Accordingly, when there is a roll (e.g., time period (ii)), the old units are closed out, and the number of units is recomputed as shown above. The units change when the system hits a roll (per the roll indicator), which may be calculated to be one day before the first position date. The system recomputes the units every roll period. Between roll periods, the number of units remains constant.

(iii) When the target futures contract is exiting a roll period:
  The interest earned is calculated as:

$$Interest\_Earned[i] = Total\_Capital[i-1] * (Interest\_Rate[i-1]) * (DayCount[i]/360) \quad \text{[Equation 2, repeated]}$$

PNL calculator component 506 calculates PNL as:

$$PNL[i] = Units[i-1](Settlement\_Nearby[i] - Settlement\_Deferred[i-1]) * Multiplier \quad \text{[Equation 5]}$$

It should be appreciated that the PNL calculator component uses the Settlement_Deferred from the previous day (as in Equation 5) when the target futures contract is exiting a roll period. As is known and as is described herein, a roll period occurs when the deferred month becomes a nearby month, e.g., in June (e.g., time period is [i−1]), the nearby month may be July and the deferred month may be September, but as June turns into July (e.g., time period is now [i]), the nearby month becomes September, which was the deferred month in the previous time period, e.g., [i−1]). In other words, equation 5 references the settlement price of the deferred price from the previously timestamped entry, (i.e., [i−1]) because the month that was deferred then is now (i.e., at time [i]) the current nearby month. Said another way, when months roll, the old deferred time is the new nearby time upon the transition from a nearby time to the deferred time.

The PNL is accordingly calculated as the profit or loss of investing a hypothetical dollar amount in a futures contract with a starting capital position that accrues gains and losses as well as interest. Over time, losses and gains are calculated to achieve an ending daily balance. Contracts are rolled from front month to first deferred on a regular interval. Specifically, the PNL accounts for accrued interest. Interest is accrued using an appropriate interest rate and is credited the next business day. It should be appreciated that the daily ending balance in the PNL includes interest earned on margin deposits as well as price changes.

In one embodiment, the PNL is margined at 100% to avoid the effect of leverage (leverage is effectively 1:1). For example, if starting capital is $1 million, and the target futures contract price is $1000 and has a contract multiplier of 100, $$\text{Initial Units} = \$1{,}000{,}000/(\$1000*100) \text{[using Equation 1 above]} = 10 \text{ contracts}$$

The number of contracts is based on the total notional value of the contract (notional value=$1000 futures price*100 contract multiplier). Hence the full value of the contract is used to compute the number of units and the PNL is accordingly margined at 100%.

Tracking value calculator component 508 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the tracking value calculator component 508 to compute the returns based on the output of the PNL calculator component 506 and to determine a tracking value that tracks the target futures contract based on the computed returns.

Tracking value calculator component 508 first calculates a total capital as $$\text{Total\_Capital}[i] = \text{Total\_Capital}[i-1] + PNL[i] + \text{Interest\_Earned}[i] \quad \text{[Equation 6]}$$

Tracking value calculator component 508 then calculates the returns as:

$$\text{Returns}[i] = \text{Log}(\text{Total\_Capital}[i]) - \text{Log}(\text{Total\_Capital}[i-1]) \quad \text{[Equation 7]}$$

Tracking value calculator component 508 then calculates the tracking value as:

$$\text{TrackingValue}[i] = \text{TrackingValue}[i-1] * (1 + \text{Returns}[i]) \quad \text{[Equation 8]}$$

In one embodiment, equation 8 may be scaled by a constant A to make the tracking value easier to mathematically compare tracking values across different target futures contracts, e.g., $$\text{TrackingValue}[i] = A * \text{TrackingValue}[i-1] * (1 + \text{Returns}[i]) \quad \text{[Equation 8, modified]}$$

The tracking module 122 accordingly generates a tracking value based on the historical market data/settlement prices and the appropriate interest rate, and can be calculated extremely quickly. In one embodiment, the tracking value is calculated at a specified frequency. For example, the tracking value could be calculated at the end of the trading day. Or, the tracking value could be calculated intra-day. Using the tracking module 122, the PNL, and thus returns, can be calculated on a high frequency basis to make the updated tracking value available almost immediately.

The exchange computing system 100 may publish the tracking value, e.g., through a market data feed, e.g., so that traders can analyze the tracking value to determine the actual profits/cost of ownership associated with the target futures contract. The tracking value can be used as an indicator of the performance of the target futures contract. For example, a trader could compare the tracking value on a first date with the tracking value on a second date. The difference in the tracking value on different dates represents the actual profit or loss a trader would have experienced if he or she held the target futures contract over the same timeframe.

In one embodiment, the tracking value is distributed, e.g., via data feeds via WAN 162, at a frequency specified by a trader.

The tracking module 122 may include tracking instrument generation component 510, which may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the tracking instrument generation component 510 to process determined tracking value information and/or other stored/received data (e.g., stored in associated exchange computing system 100 databases) to generate tracking instruments and/or associated information and/or facilitate the management of the same, and offer/list the tracking financial instrument for trading by the exchange computing system 100. Depending on the implementation, the tracking module 122 and/or associated components may generate and/or manage a variety of financial products/instruments based on/related to the tracking value calculated for a target futures contract. For example, the exchange computing system 100 may list a standardized futures contract based on the tracking value. Or, the exchange computing system 100 may list an exchange traded fund ("ETF") based on the tracking value.

Once the tracking financial instrument is generated, it may be bought and sold on the exchange computing system 100. As discussed herein, the tracking financial instrument may be bought and sold in fractional units, because the tracking financial instrument is cash settled. In many cases, a trader may find it beneficial to buy and sell futures contracts based on the tracking value, i.e., tracking financial instruments. For example, a market maker who is short (has sold) a Corn Futures Contract could advantageously go long (buy) the tracking financial instrument based on the Corn Futures Contract.

Some existing indices, such as the S&P 500 and Goldman Sachs Commodity Index (GSCI), rely on complicated weighting of many components to produce an index value. These types of indexes lack transparency, require multiple data inputs on a fixed interval, and take time and a large number of computing cycles to calculate. For example, the Cboe Volatility Index® (VIX® Index) index is disseminated every 10 seconds because it requires many option prices to compute. Some of the inputs may not have transactions or volume within the prescribed time interval. For example, on final settlement day, the S&P 500 SOQ (Special Opening Quotation) can be delayed for several minutes while all index components await opening quotes. Adding to this complexity is an alternative set of rules for when component prices are not available.

Unlike these types of financial instruments, the inputs of the disclosed tracking financial instrument are readily/easily available. Moreover, there are only a few inputs, so the tracking financial instrument can be recalculated as frequently as desired, e.g., the tracking financial instrument could be updated hourly, or every minute. The tracking financial instrument can be updated on a high frequency basis due to the small number of data elements needed, reducing complexity, latency, and the number of line items needed, thereby greatly reducing the load on a computer system. Because the inputs of the tracking value calculator component 508 are readily available, the tracking value can be calculated extremely quickly, enabling the tracking instrument to closely track the target futures contract in real time or near real time.

In one embodiment, the disclosed tracking module 122 only requires two data elements in order to calculate the value of the tracking financial instrument: front month futures contract prices and an overnight interest rate.

Figure 6:
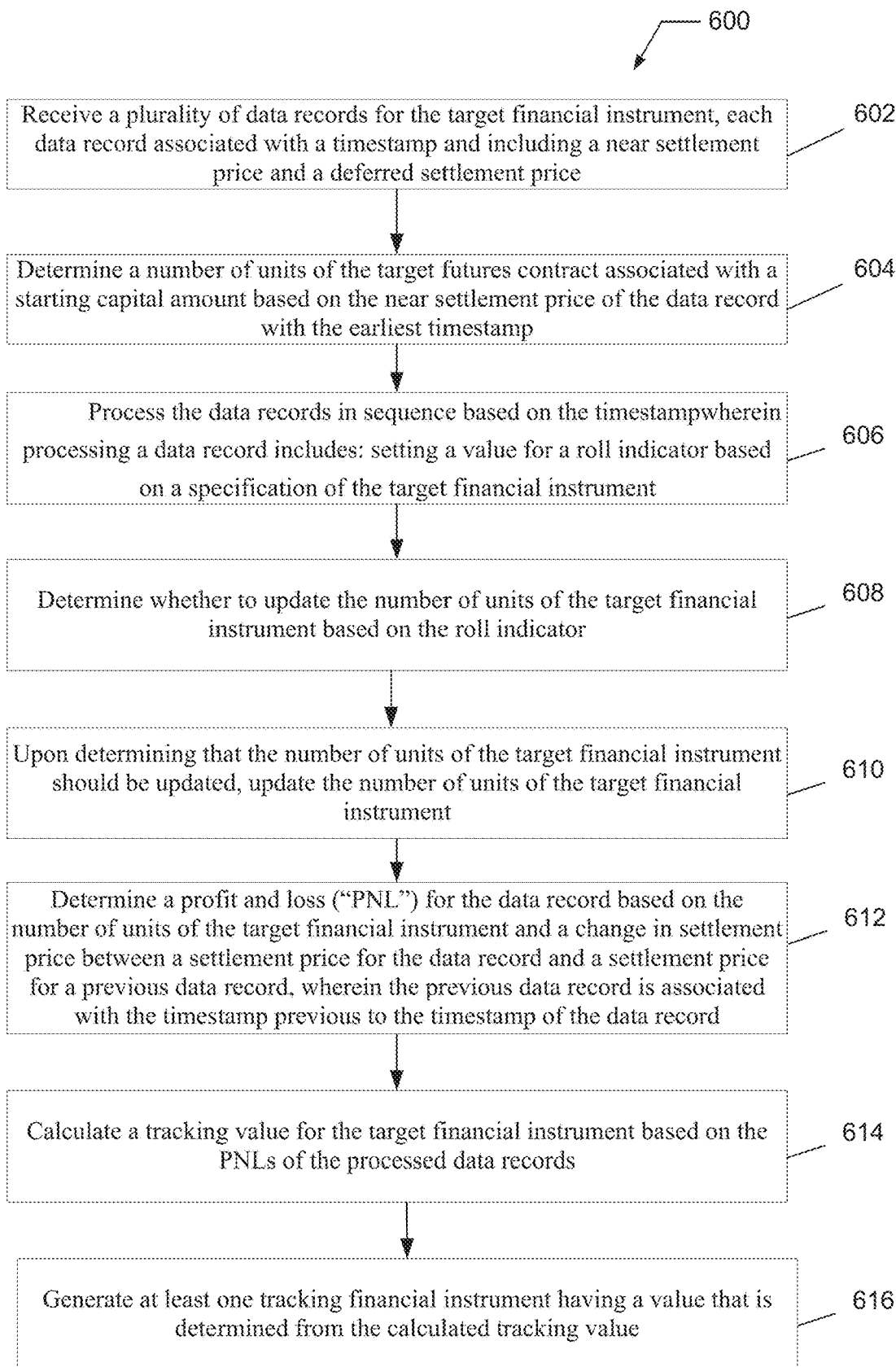
FIG. 6 illustrates an example flowchart for generating a tracking financial instrument, according to some embodiments.

FIG. 6 illustrates an example flowchart 600 for calculating tracking values, according to an embodiment of the present disclosure. Embodiments may involve all, more or fewer actions than the illustrated actions. The actions may be performed in the order or sequence shown, or in a different sequence. The actions may be performed simultaneously, or in a parallel or overlapping fashion. The method may be performed by processing logic that may comprise hardware (circuitry, dedicated logic, etc.), software, or a combination of both. In one example, the method is performed by the computer system 100 of FIG. 1, while in some other examples, some or all of the method may be performed by another machine.

At 602, method 600 includes receiving a plurality of data records for the target financial instrument, each data record associated with a timestamp and including a near settlement price and a deferred settlement price. The near settlement price may be a near month settlement price. The deferred settlement price may be a deferred month settlement price. In one embodiment, the data records represent periodic market data, e.g., daily, or hourly, market data. In one embodiment, a trader may be able to specify the periodicity of the data records.

At step 604, method 600 includes determining a number of units of the target futures contract associated with a starting capital amount based on the near settlement price of the data record with the earliest timestamp.

At step 606, method 600 includes processing the data records in sequence based on the timestamp, wherein processing a data record includes: setting a value for a roll indicator based on a specification of the target financial instrument.

At step 608, method 600 includes determining whether to update the number of units of the target financial instrument based on the roll indicator.

At step 610, method 600 includes, upon determining that the number of units of the target financial instrument should be updated, updating the number of units of the target financial instrument.

At step 612, method 600 includes determining a profit and loss ("PNL") for the data record based on the number of units of the target financial instrument and a change in settlement price between a settlement price for the data record and a settlement price for a previous data record, wherein the previous data record is associated with the timestamp previous to the timestamp of the data record.

In one embodiment, the change in settlement prices is determined based on the value of the roll indicator, in particular, whether the roll indicator for the previous day and the current day are both zero (which may indicate that the target futures contract is not in a roll period); (ii) whether the roll indicator for the previous day is zero and the roll indicator for the current day is 1 (which may indicate that the target futures contract is entering a roll period); or (iii) whether the roll indicator for the previous day is 1 and the roll indicator for the current day is zero (which may indicate that the target futures contract is exiting from a roll period).

In situations (i) and (ii), the change in settlement prices is determined based on a formula that includes the previous record's units, the current record's near settlement price, and the previous record's near settlement price.

In situation (iii), however, the change in settlement prices is determined based on a formula that includes the previous record's units, the current record's near settlement price, and the previous record's deferred settlement price.

At step 614, method 600 includes calculating a tracking value for the target financial instrument based on the PNLs of the processed data records.

At step 616, method 600 includes generating at least one tracking financial instrument having a value that is determined from the calculated tracking value.

In one embodiment, the method includes offering, to a market participant by the exchange computing system via a network interface, a financial instrument based on the tracking value to a market participant via the network by the exchange computing system.

In one embodiment, the units calculator component 502 may determine a number of units that is fractional, or has a non-zero remainder. For example, dividing a starting capital by the settlement price of the target futures contract times the contract multiplier (e.g., an application of Equation 1) may result in a non-zero remainder. The tracking module 122 generates a tracking financial instrument that can track even fractional units of the target futures contract.

The disclosed tracking module 122 improves upon trading of a futures contract in several ways. As described above, rolling traditional futures contracts can be burdensome on traders who do not wish to actually buy or sell an underlying asset. For example, a trader may roll positions forward by simultaneously offsetting his/her current position (e.g., in the nearby month) and establishing a new position (e.g., in the next/deferred contract month). For example, a trader who is long four S&P 500 futures contracts expiring in September may simultaneously sell four September contracts and buy four Dec or further away contracts to roll a traditional futures contract. Such rolling requires the trader to monitor all the futures contracts in his or her portfolio, and transmit messages to offset positions and establish new positions. As discussed herein, the disclosed embodiments can eliminate, or greatly reduce, the need to roll positions.

For example, a trader may want exposure to oil for 12 months. Instead of buying the oil futures contract, the trader can buy the disclosed tracking financial instrument based on the oil futures contract. The tracking financial instrument may have a 12 month expiry, or some other expiry that is much longer than the expirations of the target futures contract. The tracking financial instrument tracks the front month of the target futures contract, accrues interest correctly, etc. (namely, obtains all the other benefits/advantages of the tracking financial instrument as discussed herein). Instead of having to roll the target futures contract 12 times a year, the trader just has to buy the disclosed tracking financial instrument once, and wait until the 12 months expire.

Accordingly, the disclosed embodiments eliminate the need for an asset manager (or any trader who does not want to deal with delivery or physical settlement of the underlying asset) to keep track of futures contract expiration dates, or to transmit electronic data transaction request messages that result in rolling a position from a near month to a back month, thereby reducing the computational load on a trader's computing system as well as the exchange computing system.

In addition, traditional futures contracts can be difficult to track, or mimic. For example, some financial instruments attempt to track a futures contract, which as discussed above is mimicking the futures contract so closely that the performance of the financial instrument and the performance of the futures contract is indistinguishable to an ordinary asset manager. However, the use of such financial instruments typically results in tracking error, which is the difference between a futures contract and a financial instrument that tracks the futures contract. Futures contracts are standardized and are associated with a quantity, i.e., a number of units that can be bought and sold. For example, in the cash stock market, the S&P 500 is an index and one of the instruments that tracks that index is SPY. However, analysis of the SPY and the S&P 500 shows that SPY does not always track the S&P 500 index perfectly, e.g., because of management fees, or supply and demand conditions. A manager of the SPY usually attempts to avoid idle cash in order to closely track the target futures contract, so if there is an influx of demand and extra cash flows into the SPY, that extra has to be allocated to the S&P 500 index immediately, or SPY falls behind the actual index value. Accordingly, the manager who attempts to track a futures contract using traditional financial instruments continuously needs to manage the financial instrument's position (e.g., the SPY's position) so that it closely tracks the underlying futures contract (e.g., the S&P 500 index), which creates computational and logistical burdens on the manager's computing system.

In addition, even if a manager constantly adjusts positions in a financial instrument to track a target futures contract, as the value of the target futures contract changes there may be a leftover dollar amount that cannot be invested in the target futures contract, e.g., fully invested into a whole, non-fractional number of futures contracts because the exchange computing system typically would not support the purchase of fractional futures contracts. This may be referred to as a cash drag issue, or an idle cash issue. Because an exchange computing system that offers a standardized contract typically does not allow trading of fractional units of a target futures contract, there will likely be idle cash left over when attempting to buy or sell a financial instrument that tracks the target futures contract.

For example, an asset manager may wish to invest $6,800 into a futures contract that trades at $1,000. The asset manager may be able to buy 6 futures contracts, with $800 remaining as unused cash balance. If the price of the futures contract goes down to $800, the asset manager may then be able to purchase another futures contract with the $800 unused cash balance. Each purchase requires the asset manager to submit an electronic data transaction request message to the exchange computing system. When an asset manager is investing millions of dollars across a portfolio of thousands of different financial instruments, the number of electronic data transaction request messages that must be sent to the exchange computing system to invest unused cash balances can contribute to network congestion and overuse of computing resources.

The disclosed embodiments improve upon existing financial instrument because the disclosed tracking financial instrument can easily, and automatically, track even fractional units of the target futures contract. Accordingly, an asset manager who trades in the tracking instrument does not need to constantly submit electronic data transaction request messages to the exchange computing system to invest unused cash balances, thereby reducing the amount of network traffic and amount of electronic data transaction request messages that need to be processed by the exchange computing system. The trader/asset manager can more efficiently and more accurately track the target futures contract via the disclosed embodiments. The tracking instrument accordingly allows an asset manager to access a market associated with an asset, e.g., crude oil, without having to invest in crude oil futures (which as described above comes with administrative and computational expenses).

It should be appreciated that a futures contract based on the tracking value (i.e., the tracking financial instrument) will be associated with standardized units, just like most other financial instruments offered/listed by an exchange computing system. The tracking financial instrument may be cash settled. In one embodiment, the exchange computing system may allow traders to hold fractional units of the tracking financial instrument, because it would be cash settled, and it would not require the trader to deliver a physically commodity (e.g., a physical underlying asset).

The disclosed embodiments also enable comparisons of different futures contract markets. For example, it is currently difficult to compare the performance of gold futures contracts to crude oil futures contracts over a given time period. The output of the tracking module 122 for two different futures contracts can be used to compare, on the same scale, the performance of the two different contracts.

CONCLUSION

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

The invention claimed is:

1. A computer implemented method comprising:
    receiving, by a processor, a sequence of data records for a target financial instrument, each data record of the sequence of data records associated with a timestamp and including a near settlement price and a deferred settlement price;
    determining, by the processor, a number of units of a target futures contract associated with a starting capital amount based on the near settlement price of an earliest data record of the sequence of data records with an earliest timestamp, wherein the number of units of the target financial instrument is initially calculated as:
        Units=Starting Capital/(Settlement_Nearby_EarliestTimestamp*Multiplier),
        wherein the Starting Capital is the starting capital amount, the Settlement_Nearby_EarliestTimestamp is the near settlement price of the earliest data record with the earliest timestamp, and the Multiplier is a target futures contract multiplier;
    processing, by the processor, each data record of the sequence of data records in order, wherein the processing includes:
        determining, by the processor, whether to update the number of units of the target financial instrument based on whether the target financial instrument is within a threshold of a delivery date;
        upon determining that the number of units of the target financial instrument should be updated, updating, by the processor, the number of units of the target financial instrument based thereon as:
            Units=Capital/(Settlement_Deferred_CurrentTimestamp*Multiplier),
            wherein the Capital is the capital amount at the time of update and the Settlement_Deferred_CurrentTimestamp is the deferred settlement price of the data record with the timestamp at the time of update; and
        determining, by the processor, a profit and loss ("PNL") for the data record based on the number of units of the target financial instrument and a change in settlement price between a settlement price for each data record of the sequence of data records being processed and a settlement price for a previously processed data record;
    calculating, by the processor, a tracking value for the target financial instrument based on the PNLs of the sequence of data records, wherein the calculating of the tracking value includes using a formula that includes PNL, a previous capital, and interest earned as inputs;
    generating, automatically by the processor, at least one tracking financial instrument having a value that is automatically determined from the tracking value for the target financial instrument; and
    upon completion of the generating, automatically introducing, by the processor, the at least one tracking financial instrument into a financial instrument exchange market via an exchange computing system where the at least one tracking financial instrument is automatically listed for trading.

2. The computer implemented method of claim 1, wherein the calculation of the tracking value is performed intra-day.

3. The computer implemented method of claim 1, further comprising:
    offering, by the processor, to a market participant by the exchange computing system via a network interface, the at least one tracking financial instrument.

4. The computer implemented method of claim 1, wherein the number of units of the target futures contract may be fractional.

5. The computer implemented method of claim 1, wherein each of the sequence of data records is associated with a timestamp which defines the order of the data records.

6. The computer implemented method of claim 1, wherein the target financial instrument is a standardized financial instrument offered by an exchange computing system.

7. The computer implemented method of claim 1, wherein the target financial instrument is associated with an underlying asset that can be physically delivered if the tracking financial instrument is not rolled at expiry, and wherein the tracking financial instrument prevents delivery of the underlying asset to a holder of the tracking financial instrument.

8. A non-transitory computer readable medium storing processor-issuable instructions that, when executed by at least one processor, cause the at least one processor to:
    receive a sequence of data records for a target financial instrument, each data record of the sequence of data records associated with a timestamp and including a near settlement price and a deferred settlement price;

determine a number of units of a target futures contract associated with a starting capital amount based on the near settlement price of an earliest data record of the sequence of data records with an earliest timestamp, wherein the number of units of the target financial instrument is initially calculated as:

Units=Starting Capital/(Settlement_Nearby_EarliestTimestamp*Multiplier), wherein the Starting Capital is the starting capital amount, the Settlement_Nearby_EarliestTimestamp is the near settlement price of the earliest data record with the earliest timestamp, and the Multiplier is a target futures contract multiplier;

process each data record of the sequence of data records in order to:
determine whether to update the number of units of the target financial instrument based on whether the target financial instrument is within a threshold of a delivery date;
upon determining that the number of units of the target financial instrument should be updated, updating, by the processor, the number of units of the target financial instrument based thereon as:
Units=Capital/(Settlement_Deferred_CurrentTimestamp*Multiplier), wherein the Capital is the capital amount at the time of update and the Settlement_Deferred_CurrentTimestamp is the deferred settlement price of the data record with the timestamp at the time of update; and
determine a profit and loss ("PNL") for the data record based on the number of units of the target financial instrument and a change in settlement price between a settlement price for each data record of the sequence of data records being processed and a settlement price for a previously processed data record;

calculate a tracking value for the target financial instrument based on the PNLs of the sequence of data records, wherein the calculating of the tracking value includes using a formula that includes PNL, a previous capital, and interest earned as inputs;

generate, automatically, at least one tracking financial instrument having a value that is automatically determined from the tracking value for the target financial instrument; and upon completion of the generation of the at least one tracking financial instrument, automatically introducing, by the processor, the at least one tracking financial instrument into a financial instrument exchange market via an exchange computing system where the at least one tracking financial instrument is automatically listed for trading.

9. The non-transitory computer readable medium of claim 8, wherein the processor-issuable instructions, when executed by the at least one processor, further cause the at least one processor to:
offer, to a market participant by the exchange computing system via a network interface, the at least one tracking financial instrument.

10. The non-transitory computer readable medium of claim 8, wherein the number of units of the target futures contract may be fractional.

11. The non-transitory computer readable medium of claim 8, wherein the target financial instrument is a standardized financial instrument offered by an exchange computing system.

12. The non-transitory computer readable medium of claim 8, wherein the target financial instrument is associated with an underlying asset that can be physically delivered if the tracking financial instrument is not rolled at expiry, and wherein the tracking financial instrument prevents delivery of the underlying asset to a holder of the tracking financial instrument.

13. The non-transitory computer readable medium of claim 8, wherein the calculation of the tracking value is performed intra-day.

14. The non-transitory computer readable medium of claim 8, wherein each of the sequence of data records is associated with a timestamp which defines the order of the data records.

15. A tracking financial instrument generating apparatus comprising:
a memory;
a processor disposed in communication with said memory, and configured to issue a plurality of processing instructions stored in the memory, execution of the instructions generating a specialized instrument generating module that causes the apparatus to:
receive a sequence of data records for a target financial instrument, each data record of the sequence of data records associated with a timestamp and including a near settlement price and a deferred settlement price;
determine a number of units of a target futures contract associated with a starting capital amount based on the near settlement price of an earliest data record of the sequence of data records with an earliest timestamp, wherein the number of units of the target financial instrument is initially calculated as:
Units=Starting Capital/(Settlement_Nearby_EarliestTimestamp*Multiplier), wherein the Starting Capital is the starting capital amount, the Settlement_Nearby_EarliestTimestamp is the near settlement price of the earliest data record with the earliest timestamp, and the Multiplier is a target futures contract multiplier;
process each data record of the sequence of data records in order to:
determine whether to update the number of units of the target financial instrument based on whether the target financial instrument is within a threshold of a delivery date;
upon determination that the number of units of the target financial instrument should be updated, update the number of units of the target financial instrument based thereon as:
Units=Capital/(Settlement_Deferred_CurrentTimestamp*Multiplier), wherein the Capital is the capital amount at the time of update and the Settlement_Deferred_CurrentTimestamp is the deferred settlement price of the data record with the timestamp at the time of update; and
determine a profit and loss ("PNL") for the data record based on the number of units of the target financial instrument and a change in settlement price between a settlement price for each data record of the sequence of data records being processed and a settlement price for a previously processed data record;
calculate a tracking value for the target financial instrument based on the PNLs of the sequence of data records, wherein the calculating of the tracking value includes using a formula that includes PNL, a previous capital, and interest earned as inputs;

generate, automatically, at least one tracking financial instrument having a value that is automatically determined from the tracking value for the target financial instrument; and upon completion of the generation of the at least one tracking financial instrument, automatically introducing, by the processor, the at least one tracking financial instrument into a financial instrument exchange market via an exchange computing system where the at least one tracking financial instrument is automatically listed for trading.

16. The instrument generating apparatus of claim 15, wherein execution of the instructions causes the apparatus to offer, to a market participant by the exchange computing system via a network interface, the at least one tracking financial instrument.

17. The instrument generating apparatus of claim 15, wherein the number of units of the target futures contract may be fractional.

18. The instrument generating apparatus of claim 15, wherein the target financial instrument is a standardized financial instrument offered by an exchange computing system.

19. The instrument generating apparatus of claim 15, wherein the target financial instrument is associated with an underlying asset that can be physically delivered if the tracking financial instrument is not rolled at expiry, and wherein the tracking financial instrument prevents delivery of the underlying asset to a holder of the tracking financial instrument.

20. The instrument generating apparatus of claim 15, wherein the calculation of the tracking value is performed intra-day.

21. The instrument generating apparatus of claim 15, wherein each of the sequence of data records is associated with a timestamp which defines the order of the data records.

22. A tracking financial instrument generating apparatus comprising:

means for receiving a sequence of data records for a target financial instrument, each data record of the sequence of data records associated with a timestamp and including a near settlement price and a deferred settlement price;

means for determining a number of units of a target futures contract associated with a starting capital amount based on the near settlement price of an earliest data record of the sequence of data records with an earliest timestamp, wherein the number of units of the target financial instrument is initially calculated as:

Units=Starting Capital/(Settlement_Nearby_EarliestTimestamp*Multiplier), wherein the Starting Capital is the starting capital amount, the Settlement_Nearby_EarliestTimestamp is the near settlement price of the earliest data record with the earliest timestamp, and the Multiplier is a target futures contract multiplier;

means for processing each data record of the sequence of data records in order, wherein the processing includes:

means for determining whether to update the number of units of the target financial instrument based on whether the target financial instrument is within a threshold of a delivery date;

means for updating, upon determining that the number of units of the target financial instrument should be updated, the number of units of the target financial instrument based thereon as:

Units=Capital/(Settlement_Deferred_CurrentTimestamp*Multiplier), wherein the Capital is the capital amount at the time of update and the Settlement_Deferred_CurrentTimestamp is the deferred settlement price of the data record with the timestamp at the time of update; and means for determining a profit and loss ("PNL") for the data record based on the number of units of the target financial instrument and a change in settlement price between a settlement price for each data record of the sequence of data records being processed and a settlement price for a previously processed data record;

means for calculating a tracking value for the target financial instrument based on the PNLs of the sequence of data records, wherein the calculating of the tracking value includes using a formula that includes PNL, a previous capital, and interest earned as inputs;

means for generating, automatically, at least one tracking financial instrument having a value that is automatically determined from the tracking value for the target financial instrument; and upon completion of the generating, means for automatically introducing the at least one tracking financial instrument into a financial instrument exchange market via an exchange computing system where the at least one tracking financial instrument is automatically listed for trading.

* * * * *